(12) United States Patent
Jakobsen et al.

(10) Patent No.: US 7,155,097 B2
(45) Date of Patent: Dec. 26, 2006

(54) FABRICATION OF MICROSTRUCTURED FIBRES

(75) Inventors: Christian Jakobsen, Virum (DK); Jes Broeng, Birkerod (DK); Guillaume Vienne, Kobenhavn V (DK); Peter M. Skovgaard, Birkerod (DK)

(73) Assignee: Crystal Fibre A/S, Birkerod (DK)

( * ) Notice: Subject to any disclaimer, the term of this patent is extended or adjusted under 35 U.S.C. 154(b) by 126 days.

(21) Appl. No.: 10/469,541

(22) PCT Filed: Mar. 9, 2002

(86) PCT No.: PCT/DK02/00154

§ 371 (c)(1),
(2), (4) Date: Mar. 18, 2004

(87) PCT Pub. No.: WO02/072489

PCT Pub. Date: Sep. 19, 2002

(65) Prior Publication Data

US 2004/0179796 A1    Sep. 16, 2004

(51) Int. Cl.
*G02B 6/02* (2006.01)
(52) U.S. Cl. .................. 385/123; 385/125; 385/126; 385/127; 264/1.27; 264/1.28; 264/1.29; 65/439
(58) Field of Classification Search ............... 385/123
See application file for complete search history.

(56) References Cited

U.S. PATENT DOCUMENTS

| | | | |
|---|---|---|---|
| 4,046,537 A | 9/1977 | Deserno et al. .................. 65/2 |
| 4,049,413 A | 9/1977 | French | |
| 4,401,366 A * | 8/1983 | Hope ........................ 385/110 |
| 4,422,889 A * | 12/1983 | Trezeguet et al. .......... 385/104 |
| 4,456,331 A * | 6/1984 | Whitehead et al. ......... 385/105 |
| 4,710,605 A | 12/1987 | Presby | |
| 5,087,110 A * | 2/1992 | Inagaki et al. .............. 385/110 |
| 5,155,792 A | 10/1992 | Vali et al. .................... 385/125 |
| 5,167,684 A | 12/1992 | Turpin et al. | |
| 5,411,566 A | 5/1995 | Poole et al. | |
| 5,774,779 A | 6/1998 | Tuchinskiy .................... 419/2 |
| 5,802,236 A * | 9/1998 | DiGiovanni et al. ........ 385/127 |
| 5,907,652 A * | 5/1999 | DiGiovanni et al. ........ 385/125 |
| 6,160,940 A * | 12/2000 | Summers et al. ........... 385/110 |
| 6,522,433 B1 * | 2/2003 | Kelsey et al. ................. 359/34 |

(Continued)

FOREIGN PATENT DOCUMENTS

EP    0 737 873    10/1996

(Continued)

OTHER PUBLICATIONS

Argyros et al., "Ring structures in microstructured polymer Optical fibres," *Optics Express*, 9(13): 813-820 (2001).

(Continued)

*Primary Examiner*—Frank G. Font
*Assistant Examiner*—James P. Hughes
(74) *Attorney, Agent, or Firm*—Jacobson Holman PLLC

(57) ABSTRACT

A preform for a microstructured fibre or a part for a preform for a microstructured fibre. The preform or part has a length in the longitudinal direction and a cross section perpendicular thereto, and includes a rod arranged at the centre of the preform or part, with one or more tubes being concentric to the rod. The rod is sleeved inside a first of the concentric tubes, and the rod and/or at least one of the concentric tubes has grooves and/or slits extending in the longitudinal direction, with the number of innermost longitudinally extending grooves and/or slits with respect to a centre of the preform or part being at least six.

55 Claims, 21 Drawing Sheets

U.S. PATENT DOCUMENTS

| | | | |
|---|---|---|---|
| 6,539,155 B1 | 3/2003 | Broeng et al. | 385/125 |
| 6,788,865 B1* | 9/2004 | Kawanishi et al. | 385/123 |
| 2001/0026667 A1* | 10/2001 | Kawanishi et al. | 385/123 |
| 2005/0147366 A1* | 7/2005 | Large et al. | 385/123 |
| 2005/0220432 A1* | 10/2005 | Lee et al. | 385/123 |
| 2006/0120677 A1* | 6/2006 | Broeng et al. | 385/123 |
| 2006/0140558 A1* | 6/2006 | Michaloski | 385/115 |

FOREIGN PATENT DOCUMENTS

| | | |
|---|---|---|
| EP | 0 810 453 | 10/2001 |
| GB | 2 109 367 | 6/1983 |
| GB | 2 123 810 | 2/1984 |
| JP | 59050043 | 3/1984 |
| JP | 59-092940 | 5/1984 |
| JP | 60-221544 | 11/1985 |
| JP | 60-238025 | 11/1985 |
| WO | WO 99/00685 | 1/1999 |
| WO | 99/57070 | 11/1999 |
| WO | WO 99/57070 | 11/1999 |
| WO | 99/64903 | 12/1999 |
| WO | 99/64904 | 12/1999 |
| WO | 00/06506 | 2/2000 |
| WO | 00/49436 | 8/2000 |
| WO | 00/60388 | 10/2000 |
| WO | 00/60390 | 10/2000 |

OTHER PUBLICATIONS

Bado, "Ultrafast Pulses create waveguides and microchannels," *Laser Focus World*, 73-78 (2000).

Birks et al., "2D photonic band gap structures in fibre form," *Photonic Band Gap Materials*, 1-8 (1996).

Birks et al., "Full 2-D photonic bandgaps in silica/air structures," *Electronics Letters*, 31(22): 1941-1943 (1995).

Broeng et al., "Analysis of air-guiding photonic bandgap fibers," *Optics Letters*, 25(2): 96-98 (2000).

Broeng et al., "Highly increased photonic band gaps in silica/air structures," *Optics Communications*, 156: 240-244 (1998).

Broeng, "Photonic Crystal Fibers: A New Class of Optical Waveguides," *Optical Fiber Technology*, 5: 305-330 (1999).

Cregan et al., "Single-Mode Photonic Band Gap Guidance of Light in Air," *Science*, 385: 1537-1539 (1999).

Ferrando et al., "Full-vector analysis of a realistic photonic crystal fiber," *Optics Letters*, 24(5): 276-278 (1999).

Kaiser et al., "Low-Loss Single-Material Fibers Made From Pure Fused Silica," *The Bell System Technical Journal*, 53(6): 1021-1039 (1974).

Knight et al., "Photonic Band Gap Guidance in Optical Fibers," *Science*, 282: 1476-1478 (1998).

Knight et al., "Photonic crystals as optical fibres—physics and applications," *Optical Materials*, 11: 143-151 (1999).

Knight et al., "Pure Silica Single-Mode Fibre with Hexagonal Photonic Crystal Cladding," *Optical Fiber Communication Conference*, paper PD3 (1996).

Knight et al., "Properties of photonic crystal fiber and the effective index model," *J. Opt. Soc.Am.A*, 15(3):748-752 (1998).

Monro et al., "Holey fibers with random cladding distributions," *Optics Letters*, 25(4): 206-208 (2000).

Monro et al., "Holey Optical Fibers: An Efficient Modal Model," *Journal of Lightwave Technology*, 17(6): 1093-1102 (1999).

van Eijkelenborg et al., "Microstructured polymer optical fibre," *Optics Express*, 9(7): 319-327 (2001).

West et al., "Demonstration of an IR-Optimized Air-Core Photonic Band-Gap Fiber," *Proceedings of the European Conference on Optical Communications*, 41-42 (2000).

* cited by examiner

FABRICATION OF MICROSTRUCTURED FIBRES

This is a nationalization of PCT/DK02/00154 filed Mar. 9, 2002 and published in English.

FIELD OF INVENTION

The present invention relates to new methods of fabricating microstructured fibres providing improvements with respect to propagation losses, splicing losses, polarization mode dispersion, and other critical issues for practical development of microstructured fibres.

BACKGROUND OF THE INVENTION

Microstructured fibres, also known as photonic crystal fibres, photonic bandgap fibres, holey fibres, and hole-assisted fibres are today widely explored due to their potential applications within areas such as optical communications, sensor technology, spectroscopy, and medicine (see e.g. Broeng et al., *Optical Fiber Technology*, Vol. 5, pp. 305–330, 1999; Broeng et al., *Optics Communications*, Vol. 156, pp. 240–244, 1998, Broeng et al, *Optics Letters*, Vol. 25 (2), pp. 96–98, 2000; WO9964903; WO9964904; WO0060390; Birks et al., *Electronics Letters, Vol.* 31 (22), p. 1941, October 1995; Knight et al., *Journal of the Optical Society of America*, A., Vol. 15 (3), p. 748, March 1998; Knight et al., *Optical Materials* Vol. 11, pp. 143–151, 1999; U.S. Pat. No. 5,802,236; Monro et al., *Journal of Lightwave Technology*, Vol. 17 (6) p. 1093–1102, 1999; Ferrando et al., *Optics Letters*, Vol. 24 (5), pp. 276–278, 1999; WO0006506). The fibres are characterized by having a core surrounded by thin, parallel, voids/holes in a background material. The background material is most often a single material such as e.g. silica glass, and the voids/holes commonly contain air or vacuum, but they may also be filled with other glass materials, polymers, liquids, or gasses. Depending on the application, the voids/holes may be periodically or randomly distributed, or they may be distributed in specially designed arrangements incorporating both periodic and non-periodic regions (see e.g. WO9964903; WO9964904; WO0060390; U.S. Pat. No. 5,802,236, Monro et al., *Optics Letters*, Vol. 25 (4), pp. 206–208, 2000).

Typically, microstructured fibres are fabricated by a method that includes stacking a number of circular capillary tubes and one or more solid rods to form a preform that is drawn in a single or more steps using a conventional fibre drawing tower to yield a final fibre with a micron-scale structure in the cross-section—see e.g. U.S. Pat. No. 5,155,792 or Knight et al. *Optical Fiber Communication Conference*, paper PD3, 1996. Today, this method represents the most widely employed method for fabricating micro-structured fibres, but other methods have been proposed in the past:

The first microstructured fibres were investigated in the 1970's (see e.g. Kaiser et al., *The Bell System Technical Journal*, Vol. 53, No. 6, July–August 1974, pp. 1021–1039), and they were of a rib-waveguide type. Typically, the fibre preform was formed by a core rod positioned on a thin, polished plate that was suspended in a thick-walled cladding tube. The preform was normally made from a single material—typically silica—and fibres of this type are also referred to as single material fibres. The method has been improved by providing active control of the pressure in the interior of the fibre preform during drawing to control more accurately the inner structure of the fibre (see e.g. U.S. Pat. No. 4,046,537).

Another method involves drilling of holes into solid glass rods of diameter around 30 mm using an ultra-sonic assisted mechanical drill. The resulting holey canes are afterwards milled on the outside in order to realise six flats, and then drawn into hexagonal capillary tubes. Finally the hexagonal capillary tubes are stacked in a close-packed manner to produce a fibre preform that may be drawn into fibre. The method was proposed by Birks et al. (see Birks et al., *Photonic Band Gap Materials*, Kluwer 1996) as the first method for fabrication of microstructured fibres that could guide light by photonic bandgap effects.

Yet another method involves fabrication of multi-channelled glass structures using one or more steps of extrusion (see e.g. U.S. Pat. No. 5,774,779) and drawing these glass structures into microstructured fibres using conventional drawing techniques (see e.g. WO0006506).

Further improved methods for fabricating microstructured fibres have been proposed: methods using preforms incorporating so-called jigs and short-length capillary tubes and/or rods in the cladding or core region—see WO9964903 or WO0060388, respectively.

Furthermore, it is well-known to those skilled in the art of fabricating microstructured optical fibres that improved control of the fibre structure may be obtained by employment of passive and/or active control of pressure in various regions of the fibre preform during drawing to cane and/or final fibre (see e.g. U.S. Pat. No. 4,046,537, EP0810453A1, WO0049436). Finally, it should be mentioned that employment of pressure for fabrication of optical fibres, capillary tubes, and overcladding tubes for fibre preforms is a well-known technique (see e.g. GB2123810A or JP5992940 for fibre fabrication using pressurization over regions inside fibre preforms).

In PATENT ABSTRACTS OF JAPAN, appl. No. 57160845, Yokata et al. describe an optical fibre, produced using a preform comprising a quartz tube having axis-symmetrical opposed side grooves on the outside peripheral surface. Yokata et al. utilizes two grooves for realizing polarization maintaining operation of the fibre. The grooves disclosed by Yokata et al. are positioned in close to a central doped rod. The central doped rod act to form the core of the resulting fibre after drawing of the preform to fibre—in a manner similar to the core of standard optical fibres. The two grooves in the tube acts to form a non-circular shape of the doped core in order for the fibre to exhibit a high birefringence and thereby by polarization maintaining.

In order to obtain fibre that exhibits low birefringence, for example low polarization mode dispersion, PMD, it is a disadvantage to use two axis-symmetrical opposed side grooves close to the fibre core as this results in a distortion of the core region away from a circular symmetry.

In U.S. Pat. No. 4,049,413, French disclosed a method for realizing fibres having diameter fluctuations in the transmitting core. The diameter variations are obtained by etching grooves in the preform for the fibre during fabrication. The grooves are etched using lithographic. processes and are circumscribing the longitudinal axis of the preform.

It is a disadvantage of the method described by French, that it does not provide microstructured optical fibres.

It is a further disadvantage of the method described by French that it does not provide optical fibres that are uniform in the longitudinal direction.

In WO 9957070 Berkey et al. discloses a method of making a glass fibre with axially arying properties. Berkey et al. discloses fibre preforms having four grooves that may be realized using dicing saw or non-contaminating $CO_2$ laser. The grooves are placed in contact with a doped region acting as the core in the final fibre. The grooves may form air hannels over some limited lengths of the fibre and be collapsed over others. The doped core will serve as a waveguide in both cases, but the waveguiding properties will be different in the section with channels as compared to the sections without.

It is a disadvantage of the method disclosed by Berkey et al. that it does not provide optical fibres that are uniform in the longitudinal direction.

It is a further disadvantage of the method disclosed by Berkey et al. that the grooves are placed in close contact with the doped core. It is a further disadvantage of the method disclosed by Berkey et al. that it does not provide preforms with more than four grooves. It is a further disadvantage of the method disclosed by Berkey et al. that only a single layer of grooves surrounding the core region is provided.

In U.S. Pat. No. 5,907,652, DiGiovanni et al. discloses a method for fabricating air-clad optical fibres. The air-clad layer is realized using a number of capillary tubes that are positioned outside a preform rod that serves as inner cladding and core region in the final fibre. The capillary tubes may be attached to the preform rod by melting their ends to the preform.

It is a disadvantage for the realization of air-clad optical fibre to use capillary tubes, as it may be very time consuming and require a substantial amount of manual work to attach the individual capillary tubes to the preform.

It is an objective of the present invention to provide new preforms or parts thereof for microstructured fibres—in particular for air-clad fibres—as well as new methods for realizing such fibres, where the use of individual capillary tubes is eliminated. It is a further object of the present invention to provide methods of realizing preforms or parts thereof for microstructured fibres that may reduce manual work force or that may be fully automated. It is a further objective of the present invention to provide methods for realizing preforms or parts thereof for microstructured fibres comprising a very large number of air voids (more than 30 voids) in one or more annular layers.

It is a disadvantage of the method of producing fibres of the rib-waveguide type that it is difficult to accurately control the waveguiding properties of the final fibres with respect to single-mode operation, numerical aperture, propagation loss, dispersion, polarisation, etc.

It is a further disadvantage of the method of producing fibres of the rib-waveguide type that it is not suitable for fabricating periodic features in a cross section of the microstructured fibres. The method is therefore not suitable for fabricating microstructured fibres that operate by photonic bandgap effects.

It is an advantage of the method employing stacking of capillary tubes and/or rods that the above-mentioned waveguiding properties in the resulting fibres may be more accurately controlled than for rib-waveguide type fibres.

It is a further advantage of the method employing stacking of capillary tubes and/or rods that it is suitable for fabricating microstructured fibres with periodic features in the fibre cross section. Hence, the method is suitable for fabricating microstructured fibres that operate by photonic bandgap effects.

It is, however, a disadvantage of the methods that utilise stacking of capillary tubes and/or rods that the tubes/rods may slide in position with respect to each other during either preform fabrication or fibre drawing (or both). This degrades reproducibility of the fibre fabrication. This further degrades the possibility of realizing microstructured fibres that operate by photonic bandgap effects.

It is a further disadvantage of the methods employing capillary tubes that the reproducibility is further limited due to the difficulties in fabricating large numbers of capillary tubes with high uniformity in longitudinal direction of both inner and outer diameters. This degrades the possibility of realizing long lengths of microstructured fibres that operate by photonic bandgap effects.

It is a further disadvantage of the methods employing capillary tubes that cleaning of the tubes is troublesome due to difficulties in accessing the inside of capillary tubes with inner diameters of a few millimetres or less. This may degrade fibre performance with respect to propagation losses as a result of possible contamination of the inner surface of the capillary tube that cannot be removed.

It is a disadvantage of the method that utilized ultrasonic-assisted drilling that a large contamination of the preform material usually takes place during fabrication.

It is a further disadvantage of the method that utilized ultrasonic-assisted drilling and milling of flats on the sides of the glass canes that the manufacturing time is long—limiting the use of the method for large-scale production of microstructured fibres.

It is a disadvantage of the methods using close-packed stacking of circular capillary tubes and/or rods that these favour realisation of fibres with hexagonal symmetry in the cross section—and these methods are unsuited for fabrication of fibres with arbitrary cross-sectional designs.

It is an advantage of extrusion-based methods that a high reproducibility can be obtained for the final fibres.

It is a further advantage of extrusion-based methods that a high freedom in the design of final fibre cross section can be achieved simply by manufacturing of die with appropriate design.

It is a further advantage of extrusion-based methods that these are suitable for realizing long lengths of microstructured fibres that operate by photonic bandgap effects.

It is, however, a disadvantage of extrusion-based methods that the die may contaminate the fibre preform during extrusion.

It is a further disadvantage of extrusion-based methods that the glass preforms may experience devitrification during extrusion.

It is an object of the present invention to provide fibre preforms that may be fabricated without the use of extrusion or stacking of capillary tubes and/or rods.

It is a further object of the present invention to provide methods of fabricating microstructured fibres and preforms for microstructured fibres with a high reproducibility and a high degree of design freedom—as for extrusion-based methods—but where risks of contamination are greatly reduced. Especially, it is an object of the present invention to provide methods for fabricating microstructured fibres that utilize laser ablation or laser etching during preform manufacturing.

It is a further object of the present invention to provide fibre preforms for fabrication of microstructured fibres that operate by photonic bandgap effects with the use of only a single capillary tube.

It is a further object of the present invention to provide a method of fabricating microstructured fibres that operate by photonic bandgap effects where only a single capillary tube is used for manufacturing of the fibre preform.

It is a further object of the present invention to provide a method for fabricating microstructured fibres that may be connected to other fibres with low losses.

It is a further object of the present invention to provide preforms for fabrication of microstructured fibres that may be connected to other fibres with low losses.

It is a further object of the present invention to provide microstructured fibres that may be connected to other fibres with low losses.

SUMMARY OF THE INVENTION

Fabrication of microstructured fibres using stacking of a multitude of capillary tubes or using extrusion-based methods may be disadvantageous for a number of reasons, including low longitudinal uniformity, poor cleanness, low reproducibility, high polarization mode dispersion, limited flexibility of fibre design etc. The present inventors have, however, realized that the use of extrusion or a multitude of capillary tubes for the fabrication of micro-structured fibres with periodic cladding structure(s) is not required. The present invention provides new methods for fabrication of the preforms and more simple means for realising preform of high cleanliness. The present inventors have further realised manners of reducing splicing losses between micro-structured fibres and conventional fibres, as well as splicing losses between two microstructured fibres.

According to a first aspect of the present invention there is provided a tube for use in a preform for a microstructured fibre, said tube having an inner and outer surface in a longitudinal direction along the axis of said tube and a cross section perpendicular thereto, and said tube having a number of grooves and/or slits arranged at pre-determined positions in the inner and/or the outer surface and extending in the longitudinal direction of the tube.

According to the first aspect of the invention there is also, or as an alternative, provided a rod for use in a preform for a microstructured fibre, said rod having an outer surface in a longitudinal direction along the axis of said rod and a cross section perpendicular thereto, and said rod having a number of grooves arranged at pre-determined positions in the outer surface and extending in the longitudinal direction of the rod.

It should be understood that different numbers of grooves and/or slits may be arranged in the tube or rod. Thus, the number of grooves and/or slits may be at least 2, such at least 3 or such at least 4. It is also within preferred embodiments that the number of grooves and/or slits is at least 6 or at least 8. Furthermore, it is also within preferred embodiments that the number of grooves and/or slits are at least 12, such at least 18, such at least 24, such at least 30, such at least 50 or such at least 100. The grooves and/or slits may extend over a majority of the length of the tube or rod.

Preferably, all or at least a plurality of said grooves and/or slits may be arranged substantially parallel to each other. As an alternative, each of said grooves and/or slits may be arranged as helical grooves and/or slits along the outer and/or the inner surface. It is preferred that all or at least a plurality of the grooves and/or slits extend the entire length of the tube or rod, or that all or at least a plurality of the grooves and/or slits extends only a limited part of the length of the tube or rod.

In a preferred embodiment, the grooves and/or slits in the cross section are placed substantially equidistant to each other, and the grooves and/or slits may be placed in a substantially circularly symmetric manner with respect to the axis of the tube.

For the dimensions of the grooves and/or slits it is preferred that the grooves and/or slits have dimensions in the cross section in a range from 0.5 mm to 50 mm, such as from 0.5 mm to 5.0 mm, such as from 5.0 mm to 20 mm, such as from 20 mm to 50 mm. It is also preferred that a plurality of the grooves and/or slits have a length of at least 5cm, such as at least 10 cm, such as at least 50 cm, such as at least 100 cm, such as at least 150 cm.

In a preferred embodiment the tube or rod consists of a silica-based glass material. Here, the tube or rod may have a predetermined refractive index profile being realized using doping techniques.

Different techniques may be used when fabricating the tube and or rod. Thus, the tube or rod may be fabricated using sol-gel techniques. According to a preferred embodiment, the grooves and/or slits may be made using a laser ablation technique or a laser assisted etching technique. When the tube or rod consists of a silica-based material, the tube or rod may be heated to a temperature around or above 800° C. during at least part of said laser ablation or laser etching. The grooves and/or slits may be formed using a laser beam being incident on the tube or rod or parts thereof from a direction substantially perpendicular to the longitudinal direction of the tube or rod. The laser may preferably be a pulsed or a CW laser, such as a frequency doubled YAG laser, or a $CO_2$ laser.

Another fabrication techniques include a moulding process, wherein said grooves or slits are formed directly in the tube or rod during fabrication of the tube or rod using a mould with a predetermined shape.

The grooves and/or slits may as an alternative be made using a mechanical milling or drilling technique.

In a second aspect, the present invention provides a method of fabricating preforms for microstructured fibres, wherein.laser etching or laser ablation is employed to form elongated channels in the preform.

According to a preferred embodiment of the second aspect of the invention there is provided a method of fabricating a preform for a microstructured fibre, said preform having a length in a longitudinal direction and a cross section perpendicular thereto, said preform comprising elongated channels that are arranged at pre-determined positions and extending in the longitudinal direction of the preform, wherein said channels are manufactured using a laser ablation technique or a laser etching technique.

In a preferred embodiment a plurality of the channels are substantially parallel in order to have parallel holes/voids in the final microstructured fibre. In the present context, "substantially parallel" will mean that it is desired to have channels parallel but that manners of production may introduce minor longitudinal non-uniformities that may alter this. The accuracy in the etching process will determine to what degree the formation of the channels can be controlled.

It is also within an embodiment of the second aspect of the invention that each or at least part of said channels is arranged as helical channels in the longitudinal direction of the preform.

The elongated channels may be formed using a laser beam being incident on the preform or parts thereof from a direction substantially perpendicular to the longitudinal direction. Preferably a setup as schematically illustrated in FIG. 1 is used. In the present context, "substantially perpendicular" will mean that it is desired to have a beam perpendicular to the preform length, but that a systems of mirrors and lenses in practice have limitation on the accuracy of directing a beam. It may, however, not be crucial to have a beam that is not focused perpendicular to the preform length.

When the channels are substantially parallel to the longitudinal direction, the channels may alternatively be formed using a laser beam being incident on the preform or parts thereof from a direction substantially parallel to the longitudinal direction. Preferably a setup as schematically illustrated in FIG. 2 is used.

It is preferred that the laser is a pulsed laser, such as a frequency doubled YAG laser, or a pulsed or a CW $CO_2$ laser, as such laser provide high powers (typical power levels for a CW operated $CO_2$ lasers is in the range from 200 W to 800 W for processing of silica glass materials whereas much lower powers may be used for example for polymer-based materials). It is also preferred that a plurality of the channels have a length of at least 5 cm, such as at least 10 cm, such as at least 50 cm, such as at least 100 cm, such as at least 150 cm. Long lengths are desired in order to draw more microstructured fibre from a single preform. It may, however, be difficult to fabricate long, uniform lengths of channels, wherefore lengths down to 5 cm may be preferred.

According to the second aspect of the present invention, the channels may be formed in a single rod or in one or more tubes. This is advantageous for a range of reasons, including mechanical stability and cleanliness. Here, it is preferred that at least 6 channels, such as at least 8 channels, such as at least 12 channels, such as at least 18 channels, such as at least 24 channels, such as at least 30 channels, such as at least 50 channels or such as at least 100 channels are formed in the rod and/or in one or more tubes. The elongated channels may extend over a majority of the preform length. For most applications of microstructured fibres, 6 or more holes/voids in the fibre are needed to obtain a good confinement of a guided mode.

As optical fibres are most often fabricated in silica-based glasses, it is preferred that the single tube or rod comprises a silica-based glass material. The tube or rod may be fabricated using for example modified chemical vapour deposition and in preferred embodiments have a special refractive index profile in order to optimise waveguiding properties of a microstructured fibre drawn from the preform. Profiles that are known from conventional fibre technology may be advantageous as well as presently unknown profiles may prove advantageous.

When the tube or rod comprises a silica-based glass material, it is preferred that the preform is heated to a temperature around or above 800° C. during at least part of said laser ablation or laser etching. It is also within an embodiment of the second aspect of the invention to use a sol-gel technique for fabricating said preform.

In a third aspect of the invention there is provided a preform for a microstructured fibre or a part for a preform for a microstructured fibre, said preform or part having a length in a longitudinal direction and a cross section perpendicular thereto, said preform comprising: at least two concentric tubes having different inner as well as outer diameters, wherein at least one of said at least two concentric tubes has grooves and/or slits extending in said longitudinal direction.

According to the third aspect of the invention there is also provided a preform for a microstructured fibre or a part for a preform for a microstructured fibre, said preform or part having a length in a longitudinal direction and a cross section perpendicular thereto, said preform or part comprising: a rod being arranged at the centre of the preform or part, one or more tubes being concentric to said rod, said rod being sleeved inside a first of said one or more concentric tubes, wherein said rod and/or at least one of said concentric tubes has rooves and/or slits extending in said longitudinal direction. Here, the preform or part may omprise at least two tubes being concentric to the rod.

A preform or part according to the present invention may comprise any convenient number of grooves and/or slits in the tubes and/or rod. Thus, the number of innermost longitudinally extending grooves and/or slits with respect to a centre of the preform or part may be at least 2, such as at least 3 or such as at least 4. It is also within embodiments of the invention that the number of innermost longitudinally extending grooves and/or slits with respect to a centre of the preform or part is at least 6 or at least 8. Furthermore, it is also within embodiments of the invention that the number of innermost longitudinally extending grooves and/or slits with respect to a centre of the preform or part is at least 12, such as at least 18, such as at least 24, such as at least 30, such as at least 50 or such as at least 100.

The present invention also covers embodiments in which for the rod or at least one concentric tube, the number of grooves and/or slits are at least 2, such as at least 3 or such as at least 4. Preferably, for the rod or at least one concentric tube, the number of grooves and/or slits may be at least 6 or at least 8. Furthermore, it is also within embodiments of the invention that for the rod or at least one concentric tube, the number of grooves and/or slits are at least 12, such as at least 18, such as at least 24, such as at least 30, such as at least 50 or such as at least 100.

The present invention also covers embodiments in which for the rod and at least one concentric tube, the number of grooves and/or slits are at least 2, such as a least 3 or such as at least 4. Preferably, for the rod and at least one concentric tube, the number of grooves and/or slits may be at least 6 or at least 8. Furthermore, it is also within embodiments of the invention that for the rod and at least one concentric tube, the number of grooves and/or slits are at least 12, such as at least 18, such as at least 24, such as at least 30, such as at least 50 or such as at least 100.

The present invention further covers embodiments in which the preform or part comprises at least two concentric tubes having grooves and/or slits, where for each of the two tubes the number of grooves and/or slits are at least 2, such as at least 3 or such as at least 4. Here, the preform or part may comprise at least two concentric tubes having grooves and/or slits, where for each of the two tubes the number of grooves and/or slits are at least 6 or at least 8. It is also within embodiments of the invention that the preform or part comprises at least two concentric tubes having grooves and/or slits, where for each of the two tubes the number of grooves and/or slits are at least 12, such as at least 18, such as at least 24, such as at least 30, such as at least 50 or such as at least 100.

The grooves/slits may be arranged so as to substantially form channels in the preform or part. In the present context, "substantially form" channels means that the grooves/slits that extend along the preform or part may not be completely sealed off in the longitudinal direction due to manners of fabrication or minor non-uniformities in the longitudinal direction.

It should be understood that the tubes and/or rods used in an embodiment of a preform or part according to the third aspect of the present invention may be selected from any of the embodiments of tubes and/or rods according to the first aspect of the present invention. Thus, for a tube or rod having grooves and/or slits, each or at least part of said grooves and/or slits may be arranged on an outer surface of the tube or rod. Preferably, all or at least a plurality of said grooves and/or slits are arranged substantially parallel to each other and extending in the longitudinal direction of the tube or rod. Alternatively, each of said grooves and/or slits is arranged as helical grooves and/or slits along the outer surface. It is preferred that the grooves and/or slits are arranged at predetermined positions along the outer surface of the tube or rod.

It is also within the third aspect of the invention to have a preform or part wherein for a tube having grooves and/or slits, each or at least part of said grooves and/or slits are arranged as along an inner surface of said tube. Here, the grooves and/or slits may be arranged as helical grooves and/or slits along the inner surface of said tube.

It is preferred that a first concentric tube having grooves and/or slits is sleeved inside a second concentric tube and/or that all the concentric tubes are sleeved inside each other in a substantially close-packed manner in order for the grooves and/or slits to form channels being substantially sealed off in the longitudinal direction and thereby being substantially isolated from each other. Due to potential minor non-uniformities in the longitudinal direction of the tubes, it may potentially not be possible to avoid unintentional, minor gaps between tubes (non-grove/slit type of minor gaps). Thereby, also complete sealing off of all channels in the longitudinal direction may be hindered. This is the reason for using the term "substantially close-packed", "substantially sealed off" and "substantially isolated" in the present context.

Preferably, the preform or part comprises at least 3, such as at least 4, such as at least 5, such as at least 8, such as at least 10 concentric tubes being sleeved inside each other in a substantially close-packed manner in order for the grooves and/or slits to form channels being substantially sealed off in the longitudinal direction and thereby being substantially isolated from each other. Hereby, a significant number of channels surrounding the centre of the preform or part may be obtained, which may result in a significant number of microstructured feature surrounding the core of a microstructured fibre drawn from the preform.

It is also within the third aspect of the present invention to have embodiments of a preform or part, wherein a concentric tube having grooves and/or slits is sleeved inside a concentric tube having no slits or having no slits and no grooves, or wherein a concentric tube having grooves is sleeved inside a concentric tube having grooves.

The third aspect also covers embodiments in which the rod comprises parallel grooves in the longitudinal direction, said parallel grooves being formed on the outer surface of the rod. Here, the parallel grooves in the rod may be placed substantially equidistant to each other in a substantially circular symmetric pattern. Alternatively, the invention furthermore covers embodiments in which the rod has no grooves extending in the longitudinal direction.

According to a further embodiment of the third aspect of the invention, the rod may be sleeved inside the first concentric tube, where the first concentric tube has no grooves and/or slits, or, alternatively, where the first concentric tube has grooves and/or slits.

According to an embodiment of the third aspect of the invention, the preform or part may comprise at least 2, such as at least 3 or such as at least 4 concentric tubes having grooves and or slits extending in said longitudinal direction.

Preferably, the preform or part comprises an outer concentric tube having no grooves or slits.

The preform or part according to embodiments of the third aspect of the invention may have a plurality of the grooves being parallel and extending the entire length of the preform or part. Alternatively, a plurality of the grooves and/or slits may be parallel and extend only a limited part of the length of the preform or part. It is preferred that the grooves and/or slits for each tube and/or rod are placed substantially equidistant to each other in a substantially circularly symmetric manner with respect to a centre of said each tube and/or rod. In the present context, "substantially equidistance" will mean that it is desired to have an ideally equidistance between grooves/slits but that manners of production may alter this. The accuracy in the etching process will determine to what degree the distance between grooves/slits and there position can be controlled, hence, the term "substantially circularly symmetric" may refer to the potential minor inaccuracy in position of the channels.

It should be understood that the preform of part of the third aspect if the invention may have tubes with different refractive index or with refractive index different to the rod. However, according to an embodiment, the preform or part may comprise at least two concentric tubes having the same refractive index. It is also within an embodiment that the rod and the first concentric tube have the same refractive index.

According to an embodiment of the third aspect of the invention, the inner part or bottom part of the innermost longitudinally extending grooves and/or slits with respect to the centre of the preform or part may be arranged at a distance greater than or equal to 0.5 times the total radius of the preform taken from the centre to the outer surface of the preform. Furthermore, the third aspect also covers an embodiment in which the rod has a predetermined refractive index profile with a high index centre region, and wherein the inner part or bottom part of the innermost longitudinally extending grooves and/or slits with respect to the centre of the preform or part are arranged at a distance greater than or equal to 3 times the radius of said high index centre region. Here, the index profile of the rod may furthermore comprise a low index outer region surrounding said high index centre region. The index profile of the rod may be provided by use of doping techniques. The innermost longitudinally extending grooves and/or slits may be arranged in the rod, or the innermost longitudinally extending grooves and/or slits may be arranged in a tube.

Also in the third aspect of the invention it is preferred that the grooves and/or slits have dimensions in the cross section in a range from 0.5 mm to 50 mm, such as from 0.5 mm to 5.0 mm, such as from 5.0 mm to 20 mm, such as from 20 mm to 50 mm. It is often most practical to work with tubes and/or rods of dimensions allowing the above-mentioned groove/slit dimensions.

According to an embodiment of the present invention, the preform or part may include a first region of a first type of tube of a first material and a second region of a second type of tube of a second material, said first material and second material having different softening temperatures. This is in order to fabricate microstructured fibres that are advantageous with respect to splicing issues.

It should be understood that embodiments of the preform or part according to the third aspect of the invention or parts thereof may be fabricated using one or more methods selected from the above-described advantageous methods according to the second aspect of the present invention.

According to the third aspect of the present invention there is furthermore provided a method of fabricating a microstructured fibre, said method comprising the steps of: providing a preform according to an embodiment of the third aspect of the invention, drawing this preform into a microstructured fibre using one or more steps including drawing of said preform into a cane at an intermediate drawing stage. Here, a pressure inside each or at least part of the tubes or inside the channels of each or at least part of the tubes may be controlled during the step involving drawing of the preform into fibre and/or cane in order to control more accurately the size and shape of the features in the final microstructured fibre.

According to a fourth aspect of the present invention there is provided a preform for manufacturing a microstructured fibre, the preform having a length in a longitudinal direction and a cross section perpendicular thereto, said preform comprising a single capillary tube in the centre of the preform. The single tube has an inner cross-sectional dimension, $d_{inner,tube}$, and an outer cross-sectional dimension $d_{outer,tube}$. The preform further comprises a multitude of solid rods surrounding the capillary tube. A plurality of the multitude of solid rods has an outer cross-sectional diameter, $d_{outer,rod}$. The preform comprises further a first overcladding tube surrounding the single capillary tube as well as the multitude of solid rods. Preferably, some or all of the solid rods are close-packed in order to form a periodic arrangements of interstitial voids. Optionally for e.g. mechanical stability of the preform, the preform may comprise outer capillary tubes that surround a majority of the solid canes. Such outer capillary tubes should be positioned at a distance sufficiently far away from the central, single capillary tube, such that the outer capillary tubes may not form regions where any significant amount of light is transmitted in the final fibre.

In a preferred embodiment, $d_{outer,rod}$ is substantially equal to $d_{outer,tube}$ in order to realise close-packing of the rods around the single tube. It is also within an embodiment of the fourth aspect of the invention that $d_{outer,rod}$ is in the range of 0.1 times $d_{outer,tube}$ to 0.6 times $d_{outer,tube}$, such as around 0.3 times $d_{outer,tube}$. This is preferred in order to have a close to uniformly sized features in the preform allowing more simple fibre drawing. In one or more preferred embodiments the dimensions of the tube and/or rods may be selected so that $d_{inner,tube}$, $d_{outer,tube}$, and $d_{outer,rod}$ are in the range from 0.5 mm to 20 mm, such as between 1.0 mm to 3.0 mm. For practical reasons, these ranges represent preferred ranges. In particular, rods and tubes are widely available in dimensions from 1 to 3 mm.

In a preferred embodiment of the fourth aspect of the invention, the preform may include a first region of a first type of rods of a first material and a second region of a second type of rods of a second material, said first material and second material having different softening temperatures.

According to the fourth aspect of the present invention there is also provided a method of fabricating microstructured fibres comprising the steps: providing a preform according to an embodiment of the fourth aspect of the invention, drawing this preform into a cane, either while either sealing the cane in one end and drawing said cane into fibre from an opposite end or while providing an active control of a pressure inside the cane from one end and drawing the cane into fibre from an opposite end. Here, the preform may be drawn into a cane using a lower-than-atmospheric pressure inside the first overcladding tube of the preform in order to fix the multitude of solid rods in a close-packed manner while keeping open interstitial voids between adjacent solid rods. In this manner, the interstitial voids may be substantially periodically distributed in a honeycomb structure. In this context "substantially periodically distributed" is used for the same reasons are previously discussed relating to minor longitudinal non-uniformities. It is preferred that the pressure inside the single capillary tube is controlled during drawing of the preform to cane.

The methods according to the fourth aspect of the invention may also cover an embodiment, where the cane is placed in a second overcladding tube to yield a second preform. Preferably, the pressure inside the second overcladding tube is controlled during drawing of the second preform into fibre in order to control the dimension and/or shape of the interstitial voids in the fibre.

According to a fifth aspect of the present invention there is provided an optical fibre having a longitudinal direction, said optical fibre having a length in the longitudinal direction and a cross section perpendicular thereto, wherein said fibre in the cross section comprises: a first region being microstructured and having a first background material, and a second homogenous region of a second material, said first background material and said second material having different softening temperatures. This may provide microstructured fibres with improved properties with respect to splicing.

It should be understood that the optical fibre of the fifth aspect of the invention may be drawn from any of the above described preforms, wherein the preform includes a first region of a first type of tube of a first material and a second region of a second type of tube of a second material, said first material and second material having different softening temperatures, or from any of the above described preforms, wherein the preform includes a first region of a first type of rods of a first material and a second region of a second type of rods of a second material, said first material and second material having different softening temperatures.

It is preferred that the first region of the optical fibre has a substantially circular, ring-like shape, said first region being positioned substantially symmetrically around a centre of the optical fibre. In this context "substantially circular" and "substantially symmetric" are used for the same reasons are previously discussed relating to minor longitudinal non-uniformities, but may also refer to that the first region may be formed from a number of combined features—such as circular rods stacked in a ring around the core.

It is also preferred that the second material is a glass softer than pure silica such as silica doped with fluorine, phosphorous, and/or germanium.

The fifth aspect of the present invention also includes an optical fibre splice comprising at least one end of one of the above-described embodiments of an optical fibre having a microstructured first region.

The fifth aspect of the present invention also includes a first long length of optical fibre comprising a first short length of one of the above-described embodiments of an optical fibre having a microstructured first region, and a second short length of an optical fibre. In the present context, "short length" refers to a length shorter than a total fibre distance labelled "long length". It is important to notice that the short length may be in the range from a few centimetres to several kilometres or hundred of kilometres. Here, the second short length may be a length of a conventional, single mode fibre or of an optical fibre having a microstructured region.

In a preferred embodiment, the first long length of optical fibre having the first and the second short lengths, further comprises a third short length of a third optical fibre. Here, the first short length of microstructured fibre may serve as an intermediate fibre length between the second short length and the third short length. This may provide low propagation loss for light travelling from the second length of optical fibre to the third short length of optical fibre and/or vice versa. Here, the third optical fibre may be an optical fibre having a microstructured region.

For the preforms or optical fibres of the present invention having a microstructured region, it is preferred that said preforms or optical fibres in the cross section have a periodic structure within said microstructured region, which preferably may be a hexagonal symmetry. However, it is also within embodiments of the present invention that the preforms or optical fibres in the cross section have a non-periodic structure within said microstructured region.

The present invention also includes an optical fibre selected from embodiments of the above described optical fibres having a microstructured region or made using a method selected from any of the above-described methods for producing an optical fibre having a microstructured region, wherein the microstructured region in the cross section has microstructured features that are isolated from each other. A plurality of the microstructured features may have a centre-to-centre distance to a nearest neighbouring microstructured feature in the range from 0.5 μm to 20 μm, such as from 0.5 μm to 2.0 μm, such as from 2.0 μm to 10 μm, such as from 10 μm to 20 μm. These ranges may relate to microstructured optical fibres within various applications, such as relating to non-linear microstructured fibres, photonic bandgap guiding microstructured fibres, microstructured with special dispersion properties, large mode area microstructured fibres etc.

Microstructured fibres of the present invention are mainly aimed at telecommunication applications, in accordance with general requirements in the telecommunication industry, So, a preferred embodiment of an optical fibre comprises one of the above-described fibres having a microstructured region that guide light in a single mode of propagation at a predetermined wavelength in the range from 0.3 μm to 1.8 μm.

It should be understood that the preforms or optical fibres of the above-described embodiments of the present invention may comprise silica-based materials. Silica is the preferred material in the telecommunication industry and may, naturally, also be preferred for the fibres. of the present invention.

The present invention also covers embodiments wherein the preforms or optical fibres in any of the above-described embodiments comprise polymer-based materials. Polymers provide a potential range of advantageous due to high flexibility during manufacturing and may therefore be preferred for the fibres of the present invention.

In order to control more accurately properties such as bending losses and dispersion—potentially with tunability—preferred embodiments of above-described preforms or optical fibres may have an outer shape in the cross section that is non-circular, such as preferably elliptical in shape. Here, the outer shape may have a predetermined orientation that is determined with respect to an orientation in the cross section of the structure around the centre of the preform or microstructured fibre.

According to a sixth aspect of the present invention, there is provided a second long length of optical fibre, said second long length having a longitudinal direction and a cross section perpendicular thereto, said second long length of optical fibre comprising: a first short length of a first optical fibre; a second short length of second optical fibre; a third short length of a third optical fibre; said first optical fibre comprising a microstructure, said third optical fibre being a conventional optical fibre, said second optical fibre serving as an intermediate fibre between said first optical fibre and said third optical fibre in order to provide low propagation loss for light travelling from said first optical fibre to said third optical fibre and/or vice versa. In a preferred embodiment, the second optical fibre of the second short length comprises a first region of a first material and a second region of a second material, where the first material has a softening temperature $T_1$ and said second material has a softening temperature $T_2$ being higher than $T_1$.

It is preferred that the first optical fibre of the first short length comprises a material constituting a background material in a microstructured volume of the first optical fibre. It is also preferred that the second optical fibre of the second short length in the cross section has the second material positioned substantially in a circular, ring-shaped region, substantially symmetric around a core of the second optical fibre. Here, the second material may have a lower softening temperature than said background material.

It is also within the sixth aspect of the invention that the second optical fibre of the second short length comprises a tapered core region in order to provide mode matching at both ends of the second optical fibre and thereby provide low propagation loss for light travelling from said second to third short length of optical fibre and vice versa.

It is preferred that the first optical fibre of the first length is an optical fibre selected from any of the above described fibres having a microstructured region.

BRIEF DESCRIPTION OF THE DRAWINGS

FIG. 11 shows further (bottom) a microscope photograph of a cane drawn from a preform according to the present invention.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention relates to a number of improvements for the realisation and use of microstructured fibres.

Microstructured fibres are generally divided into two types depending on the physical mechanism responsible for the light guidance: at an operating wavelength, index-guiding microstructured fibres are characterised by a core having a higher refractive index than a surrounding cladding region (as known from conventional optical fibres), and photonic bandgap microstructured fibres are characterised by a core having effectively a lower refractive index than a surrounding cladding region having periodically distributed features (see e.g. Broeng et al, *Optical Fiber Technology*, Vol. 5, pp. 305–330, 1999 for a presentation of the classification of the two groups). While the physical mechanism causing the waveguidance in the two types is different, the improvements disclosed by the present inventors relate to both types of microstructured fibres.

The present invention will mainly be described by way of example using a number of selected figures.

Firstly, the present invention relates to new preforms or parts thereof for microstructured fibres and methods for producing such preforms.

Preforms or parts thereof for microstructured fibres are generally made from glass containing columns of air arranged in a certain way that ensures the special light guiding properties of the fiber drawn from it. Usually the preform comprises bundles of tubes and rods that provide the air columns. Due to the afore-mentioned disadvantages of using a multitude of capillary tubes (see BACKGROUND OF THE INVENTION), it is advantageous to realize new types of preforms and methods for their fabrication. The present inventors have realized such a method where the air columns may be formed directly in a solid glass rod.

The glass used in preform fabrication for optical fiber, e.g. silica based glasses, usually are optically very transparent for light within a large wavelength range from infrared and down to near ultraviolet (UV). When applying very intense optical fields, e.g. from short laser pulses, higher order optical nonlinear processes may occur, such as multi-photon absorption. At certain levels this has been demonstrated to induce a change in the index of refraction of glass and at even higher intensities ablation occurs creating cavities in the bulk (see e.g. Philippe Bado, *Laser Focus World*, April 2000).

Figure 1:
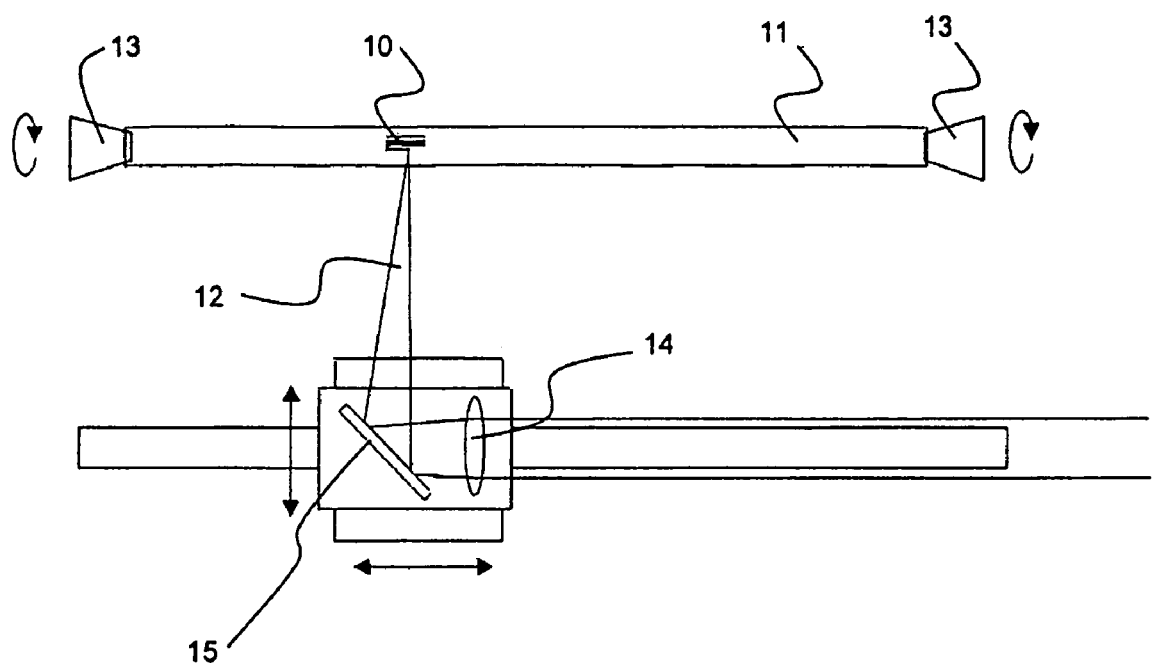
FIG. 1 shows schematically a setup for fabrication of preforms or parts thereof for microstructured fibres using laser ablation or laser etching.

In the prior art, waveguides and microchannels created using laser ablation are demonstrated on a micrometer scale—the waveguides and microchannels are formed directly in the glass at the desired final dimensions. The present inventors have, however, realized that laser ablation can be used to form voids of millimeter dimensions in a solid glass rod or in a tube. The present inventors have further realized a method that utilizes millimeter-scale laser ablation for fabrication of preforms for microstructured fibres. Especially, the present inventors have realized that voids (10) with an elongated shape in the longitudinal direction of a fibre preform may be fabricated using a setup as schematically illustrated in FIG. 1. The elongated shape is obtained by transverse movement of either the perform (11) during laser ablation or of the laser beam (12) itself. The method provides a significant improvement for realization of ultra-clean preforms for microstructured fibres, as the method, in principle, allows contamination-free formation of channels inside a glass rod with channel lengths of several tens of centimeters and of cross-sectional dimensions of up to several millimeters. The method further provides a high accuracy—laser ablation provides a control of dimensions of better than 1 micron according to the above-mentioned reference. The high accuracy that is obtained results from a strong intensity dependence of higher order optical nonlinearities, wherefore ablation will occur only in very confined areas of the most intense optical fields. The present method, therefore, provides a highly reproducible manner of fabricating preforms for microstructured fibres, and hence for the fabrication of microstructured fibres. Preferred lasers for the preform fabrication are pulsed lasers with high peak power, e.g. femtosecond laser systems or frequency doubled YAG lasers, also $CO_2$ laser in CW operation may be preferred.

The method may also include the use of more than a single laser beam for the formation of the channels inside the glass rod. For example, a high power beam with a broad focus may perform a low precise, millimeter-scale formation of the channels, while a less powerful beam with a smaller focus may be used to perform high precision adjustment of the dimensions of the channels. As another example, two or more beams (focused or non-focused) may coincide in a predetermined region within the preform to obtain a higher intensity than when using a single beam. By again moving the region of coincidence, either using beam or preform movement, elongated millimeter-sized features may be fabricated. The advantage of using more such crossing of multiple beams is that the focusing systems needs to be less precise, or it may completely be avoided.

The preform may, naturally, be consisting of a series of tubes of different doping species, if necessary.

As an example, a glass rod or tube (11) can be made into a preform or parts thereof for microstructured fibres by mounting it in a holder (13) that will.allow rotation of the glass rod or tube (11) along its axis into certain angular positions and directing a focused laser beam (12) into the rod or tube using a system of lenses (14) and mirrors (15). Starting-from the inner part of the rod or tube, channels of glass free regions (10) can be formed by laser ablation by moving the focal point along the axis of the rod or tube. After a channel has been made the rod or tube is rotated a certain angle, determined by the design of interest, and another channel can then be made. By moving the lens in direction away from the rod or tube, channels can be made on larger radii in the rod or tube.

It is an advantage of the above-described method that the channels are fabricated in a manner where they are completely fixed in position with respect to each other. This allows a higher reproducibility of specific channel arrangements.

It is a further advantage of the method that the channels are protected from the outside atmosphere and, therefore, will have the lowest degree of contamination that can be imagined—yielding microstructured fibres with ultra-low absorption losses that are comparable to those of pure, fused silica.

The high degree of control of the laser beam during ablation provides a further advantage of the method, namely the possibility of fabricating practically arbitrary structures in the preform.

The present inventors have further realized that the preform fabrication for microstructured fibres may be done also by "drilling" the holes in a rod or tube (of glass, polymer or another material) by use of a powerful laser, e.g. a $CO_2$-laser that is strongly absorbed by the glass or polymer material. This type of drilling is performed without mechanical means—as e.g. for the ultra-sonic drilling known from the prior art—and we use the term "drilling" to stress the unconventional manner of forming the holes.

Figure 2:
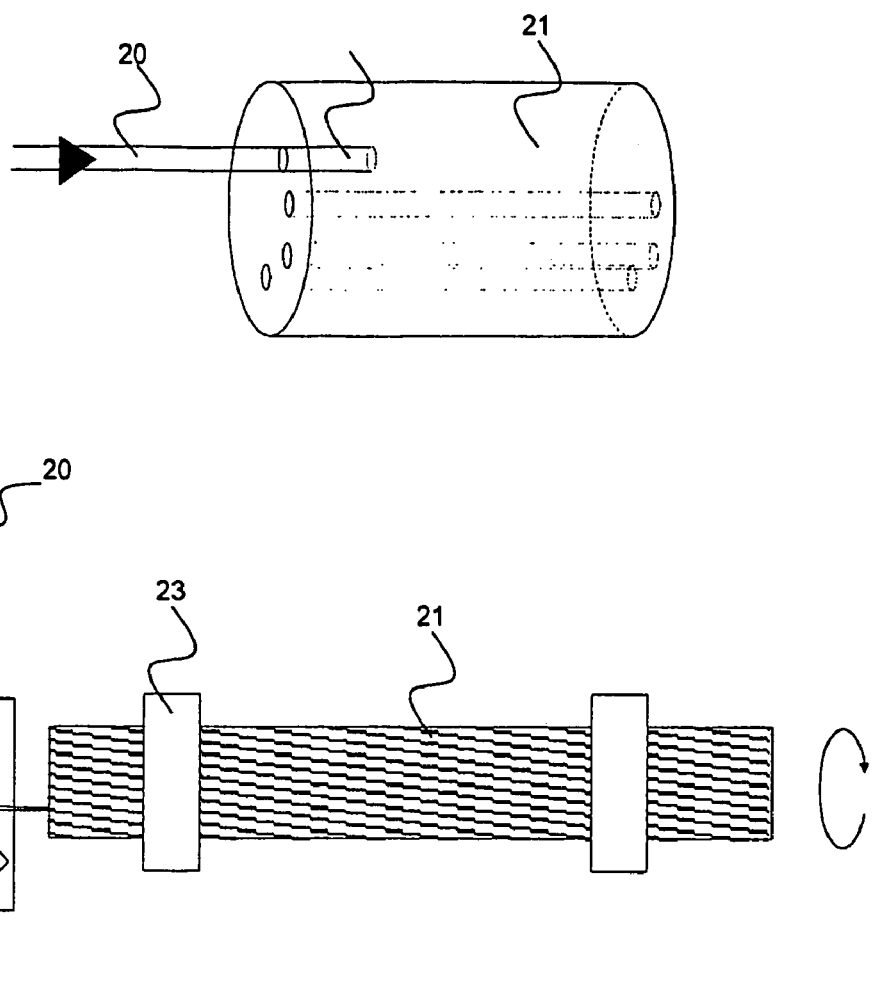
FIG. 2 shows schematically another setup for fabrication of preforms or parts thereof for microstructured fibres using laser ablation or laser etching.

With respect to FIG. 2 that provide an example of the "drilling" process, a laser beam (20) is aimed on one end of a glass rod (21) and in a direction parallel to the axis of the rod. The glass in the laser beam path will evaporate and thus form a channel of air (22) in the rod. This method provides a great freedom in designing the preform. Like the other example of the method realized by the present inventors this is a very clean manner of fabricating preforms that may be fully automated. Also, the method may reduce the complexity of the inventory to solid rods, simply, if used as the only method in preform fabrication. The above-described example is for.a glass rod, but also other types of materials may be used as well as a tube instead of a rod may be used.

The setup for fabricating a preform or parts thereof according to the above-described scheme can be as simple as that shown in FIG. 2. The glass rod (21) is mounted in a fixture (23) that holds the rod and rotates it around its axis to any predetermined angular position. The laser beam (20) is directed towards the end of the glass rod by a mirror (24) on a translational stage (25). The first motion dictates the angular position and the latter determines the radial position of the hole to be "drilled".

Figure 3:
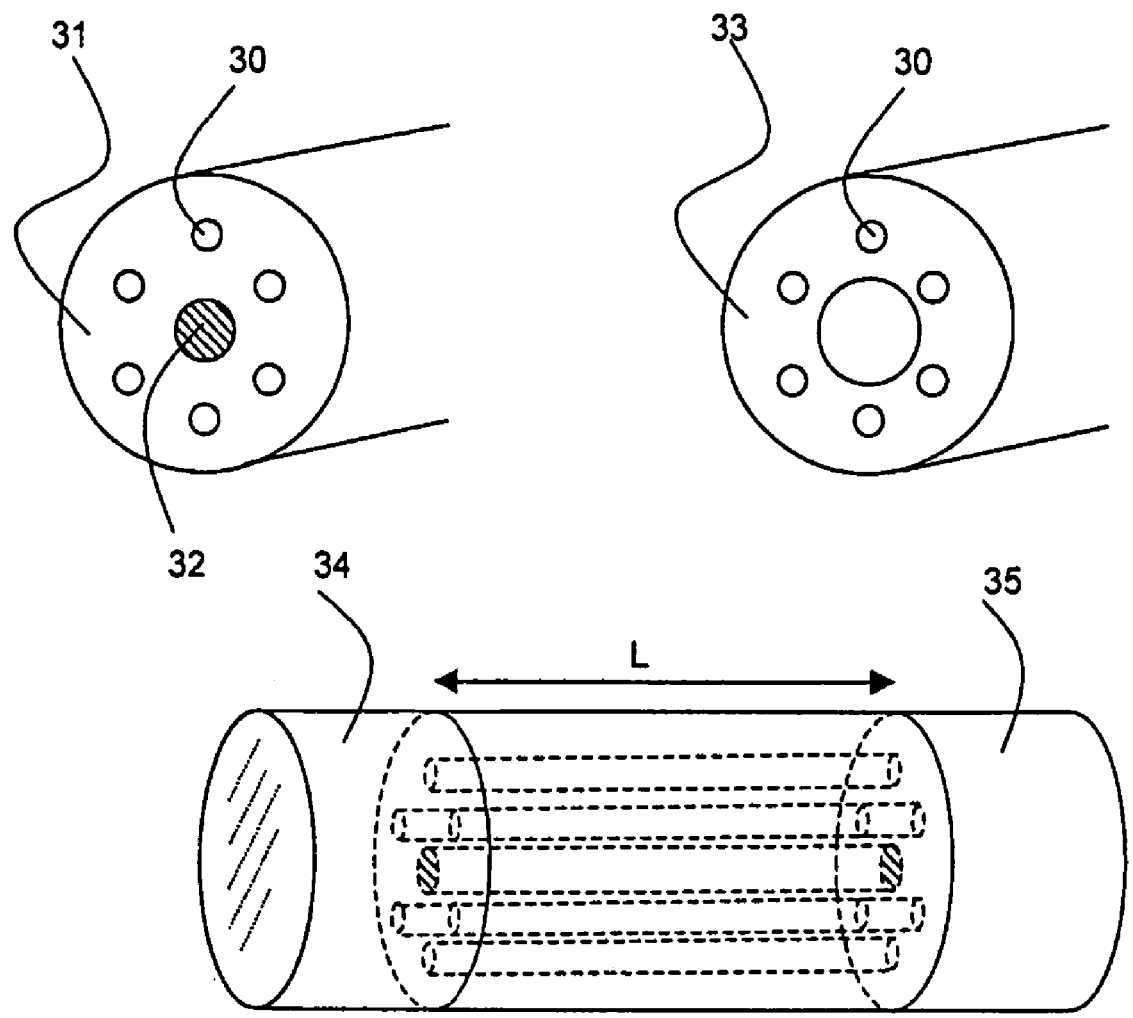
FIG. 3 shows schematically a solid rod and a hollow tube according to the present invention. The rod and tube each comprising six channels that may be realised using laser ablation or laser etching. The rod may optionally comprise a doped part. The channels may for example be fabricated sub-surface in a rod or a tube over a given length, L, as further shown schematically in the figure.

In the methods described above, the laser processing may be performed from an outside surface of the rod/tube or the processing may be performed sub-surface. As schematically shown in FIG. 3, the channels (30) in a rod (31) comprising an optionally doped core (32) or in a tube (33) may be open in one end or both ends of the rod/tube. Alternatively, the channels may be made directly inside a rod or a tube leaving one end (34) or both ends (34), (35) of the rod/tube closed. The channels may, therefore, extend a given length, L, being shorter than or equal to the full length of the rod/tube. After realization of the sub-surface channels, the rod/tube may be cleaved or cut at a given position to give access to the channels, such that for example pressure control may be performed during further steps. Such further steps may include the rod/tube being used as a preform by themselves or as parts of a preform for drawing into microstructured fibre in one more steps. Naturally, the rod/tube may also be cleaved or cut at more than one position to open up the channels over the full length of the rod/tube.

The present inventors have realised yet another advantageous method for realising preforms for microstructured fibres. The method utilizes in preferred embodiments, a number of densely sleeved tubes at least one of these having grooves and/or slits along its length.

Figure 4:
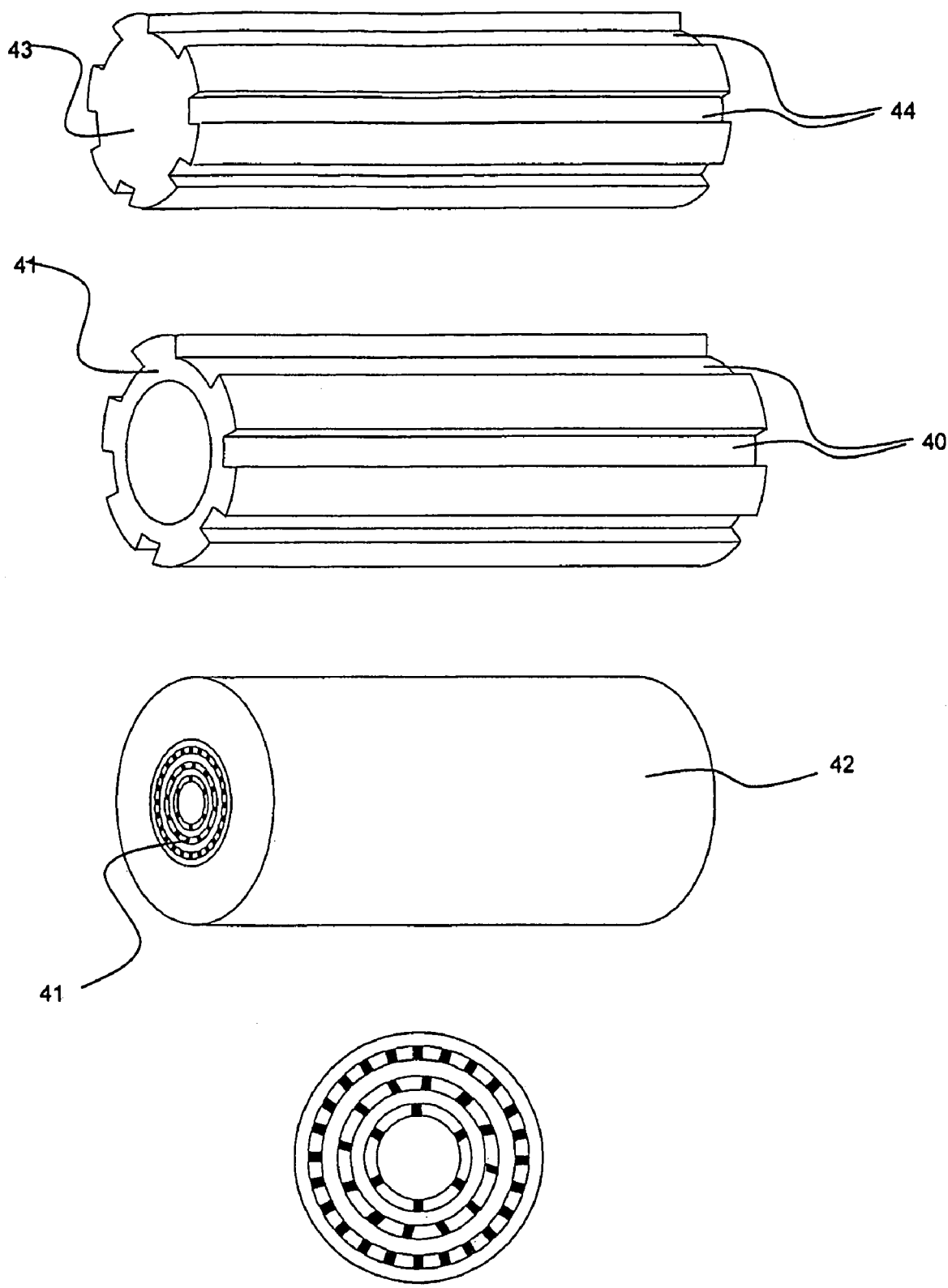
FIG. 4 shows (from top and down): a solid rod with parallel grooves along a distance of its length, a tube with parallel grooves along a distance of its length, an overcladding tube, and a preform with tubes having grooves along its length, the grooves forming air channels due to a sleeving of the tubes in concentric manner. The preform may have a tube in the centre in order to provide a low-index core region in the fibre drawn from the preform. The grooves are preferably positioned in a two-dimensionally periodic structure, or in one or more concentric annular region. This may for example be used for realization of low-index core microstructured fibre that guide light using photonic bandgap effects.

As an example, the method involves $CO_2$ laser etching of elongated grooves (40) on the surface of a tube (41) in its longitudinal direction—see FIG. 4. The tube (41) may afterwards be sleeved inside one or more tubes in a dense, concentric manner such that the grooves may form elongated channels. An arrangement of concentric tubes. having elongated grooves may form a preform (42) suitable for manufacturing of microstructured fibres. In a cross-section of the preform, the sleeved tubes may form a number of ring-shaped regions that may result a number of annular regions of microstructured features in the final microstructured fibre. In order to close off the side walls of the channels in their longitudinal direction, it may be advantageous to heat the preform during or after sleeving of the tubes. It may be even further advantageous to apply a slight under pressure inside the tubes to ensure tight sleeving and closure of the side walls of the channels in the longitudinal direction. Naturally, a too strong under pressure would collapse the channels and should be avoided.

During drawing of the preform to fibre or an intermediate stage, it may be preferred to control the pressure inside the tubes—either each tube individually or all tubes together— to improve the control of the size and/or shape of the microstructure in the final fibre. Specifically, for the fabrication of microstructured fibres with a hollow core, it is preferred to control pressure inside the innermost tube separately from the remainder of tubes as the central hole in the innermost tube has preferably a larger cross-sectional dimension than the cross-sectional dimension of the channels accessible from inside the remainder of tubes. Due to different dimensions, the innermost hole and the channels will most often behave differently during fibre drawing and it is, therefore, advantageous to control the pressure inside them separately.

As another example, the preform may contain a solid rod (43) with a multitude of elongated grooves (44) etched along its length, and the preform may further contain one or more concentric tubes surrounding the solid rod. These tubes may, naturally, contain the same type of above-discussed elongated grooves.

As the core of a microstructured fibre may be realised using the same material as the background material of the cladding (for example pure silica), it is preferred to have a certain number of voids surrounding the core in order to confine light efficiently. Also, it may be preferred to have certain number of annular regions of voids (rings) surrounding the core to provide low leakage losses of the microstructured fibre. Therefore, preferably the number of grooves in the rod or tube is around six or higher. While pure silica core microstructured fibres may be preferred for certain applications, the methods disclosed in the present invention may, naturally, also be employed for microstructured fibre comprising doped cores. Hence the present invention also covers rods with a given refractive index profile, as well as rods comprising various kinds of active dopants—such as for example Er, and/or Yb. For microstructured fibre with a low-index core, such as for example an air-guiding PBG fibre, it is also preferred to have a large number of voids placed in rings around the core. Hence, also for such types of microstructured fibres, it is preferred to have a number of tubes with a relatively large number of grooves, such as at least 6, 12, 18, 24, 30 or at least 36 grooves.

Figure 5:
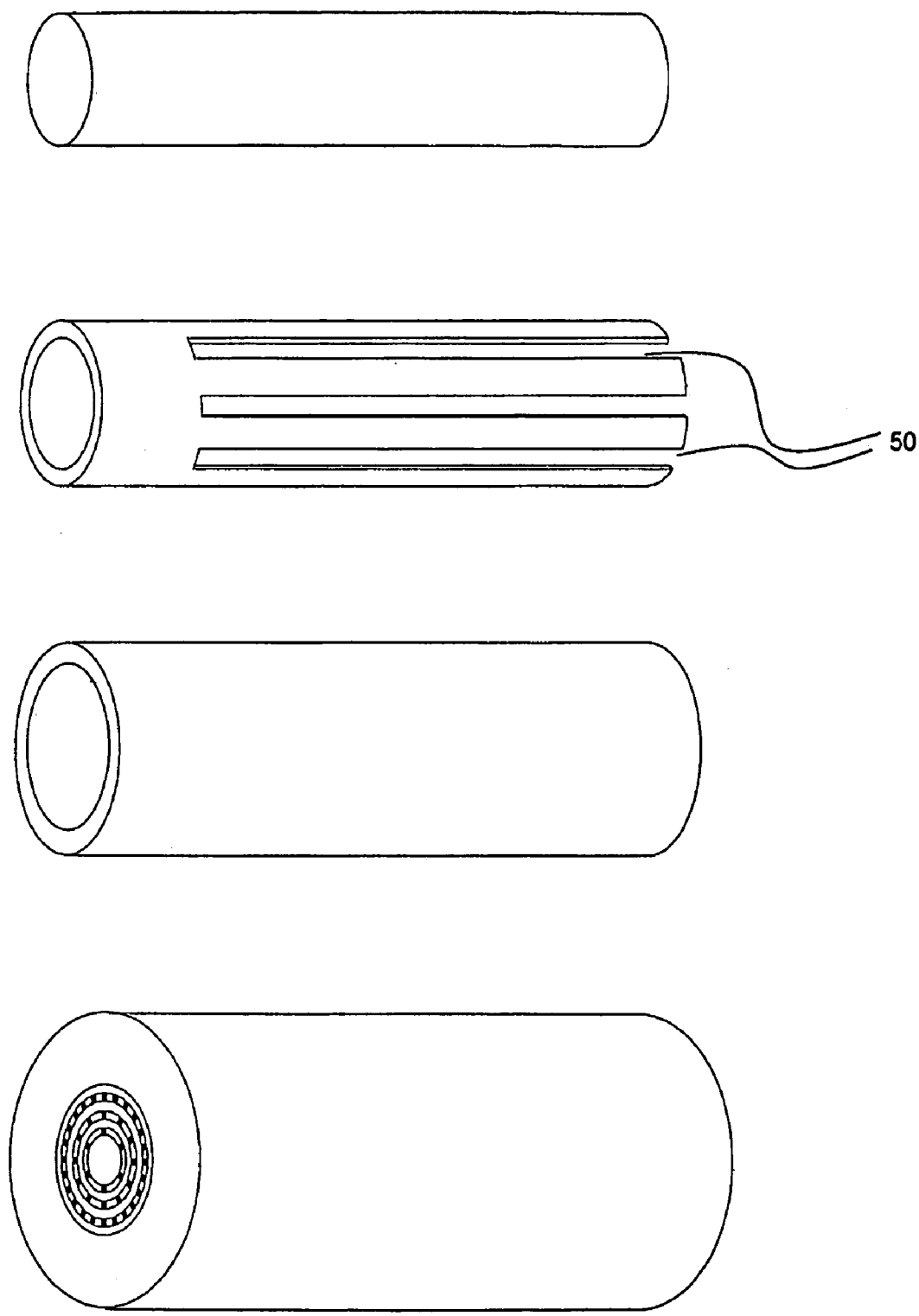
FIG. 5 shows (from top and down): a solid rod, a tube with parallel slits along a distance of its length, an overcladding tube, and a preform with tubes having slits along their lengths, the slits form air channels due to a sleeving of the tubes in a concentric manner. The preform may have a solid rod in the centre in orderto provide a high-index core region in the fibre drawn from the preform.

As yet another example, the tube may contain slits (50) that are formed using the same type of etching as used for the formation of the grooves—see FIG. 5. Naturally, two slits may not extend the entire length of a tube in order for the tube to remain in one piece.

The rods and tubes needed for the multi-sleeving type of preform may be fabricated using a setup resembling the one presented in FIG. 1, but where the grooves are formed on the outside surface of the rods/tubes. For the fabrication of slits in the tubes, the etching may be done from the outside surface of a tube all the way through the tube wall.

Figure 6:
FIG. 6 shows a photograph of a tube with a large number of slits that have been fabricated using a method according to the present invention.

FIG. 6 shows a photograph of a tube for a preform or parts thereof according to the present invention having a large number of slits. The slit have been fabricated using the above-described method using laser etching with a $CO_2$ laser. The photograph shows one section of the tube with slits. The slits only extend a limited length of the tube. It ensures mechanical stability to limit the lengths of the slitted sections and leave a section between these non-processed. A second tube that the slitted tube is sleeving into can be seen in left of the photo. The width of bridges between slits may be processed such that it ranges from some millimetres and down to some tens of microns. Practical limitations are determined by requirements on mechanical stability.

The tube in FIG. 6 was processed by a laser system based on a Howden laser with a maximum power of up to 2.8 kW. The slits were etched in a pure silica tube with an outer diameter of 29 mm and an inner diameter of 24 mm, the etching was perform using 200 W of power and the etching speed was 100 mm/min. By setting the annular step of the rotation of the tube to 12°, 30 bars with a length of 100 mm were made (a bar being the bridging region between two slits). Lower annular stepping was also performed down to 6° yielding a robust tube with slits of dimensions of less 100 μm in width, and more than 50 slits.

Figure 7:
FIG. 7 shows a photograph of a rod with a large number of grooves that have been fabricated using a method according to the present invention.

FIG. 7 shows a photograph of a rod having a large number of grooves according to the present invention (top figure). The physical parameters of the grooves (width and depth) may be different in the different sections. The specific tube and rod shown in FIGS. 6 and 7 has a large number of slits/grooves, respectively. The large number of slits/grooves (in excess of 50) is easily obtained by programming of the laser etching system. After mounting of the tube/rod in a setup as schematically shown in FIG. 1, the laser etching processes may be automated using programmable robotic techniques. Hence, manual work for realization of a large number of slits/grooves becomes very limited and compared to prior art methods of realizing microstructured fibres using manual stacking and attachment of capillary tubes for realization of voids in micro-structured fibres, the here-disclosed methods provide much lower manual work. Hence, production of microstructured fibres may be more automated using the present invention and reproducibility may also be improved using high-precision robotic techniques for the laser etching process.

The rod in FIG. 7 was processed by the same laser system as for the tube in FIG. 6, 60 grooves were etched in a silica rod with an outer diameter of 33 mm, the etching was performed using 600 W of power and the etching speed was 500 mm/min.

As an improvement to the laser etching process, the present inventors have realized that it may be an advantage to rotate the focus of the laser beam during etching.

Figure 8:
FIG. 8 shows a photograph of a tube with six slits that have been fabricated using a method according to the present invention.

The large number of slits/grooves in FIGS. 6 and 7 render the dimensions of the individual slits/grooves significantly smaller than the dimensions of the tube/rod itself. FIG. 8 shows another example of a tube according to the present invention; the tube has six grooves of dimensions that have a relatively small difference compared of the dimensions of the tube. The dimensions of the grooves are on the order of several millimetres, whereas the dimensions of the grooves/slits in FIGS. 6 and 7 significantly smaller—as previously mentioned. FIGS. 6, 7 and 8, therefore, show that a large range of dimensions as well as number of the grooves/slits are possible to fabricate using the here-disclosed methods.

Figure 9:
FIG. 9 shows a photograph of a section of a preform according to the present invention. The preform may be used for fabrication of high NA fibres for use as for example cladding pumped fibre lasers or amplifiers.

For realization of for example air-clad fibres having a high numerical aperture (NA), it is an advantage to have a high air filling fraction in the air-clad layer. The here-disclosed methods provide an improved method for realizing high NA fibre based on an air-clad layer. FIG. 9 shows an example of a preform for an air-clad fibre realised using a method according to the present invention. The figure shows a photograph of an outer section of the preform. The preform consists of a central rod in a tube with a number of slits which again is sleeved inside another tube. The three elements have been fused together in a conventional drawing tower at a temperature of 2000° C. and pulled into the preform that measures approximately 5 mm in diameter.

High NA fibres find extensive use in for example cladding pumped fibre lasers or amplifiers. Such fibres may comprise a doped, active core and voids in an air-clad layer that are positioned at a significant distance away from the doped core. Typically in the final fibre, the core diameter is in the range from 5 μm to 25 μm and the inner parts of the air-clad layer are typically placed a distance of at least three times the core radius from the doped core. Hence, for realization of preforms for high NA fibres for use as fibre laser and amplifiers, it may, therefore, be preferred to have the grooves/slits/channels placed at a certain distance away from the doped core. In preferred embodiments, the grooves/slits/channels of a preform according to the present invention are positioned in at least one annular region surrounding the preform centre, where a distance from the preform centre to an inner part of the grooves/slits/channels is more than half the preform radius. In other preferred embodiments, the grooves/slits/channels are positioned at a distance from a doped core of more than three times the radius of the doped core. The above-described distances refer to distances in the cross-section of the preform.

Figure 10:
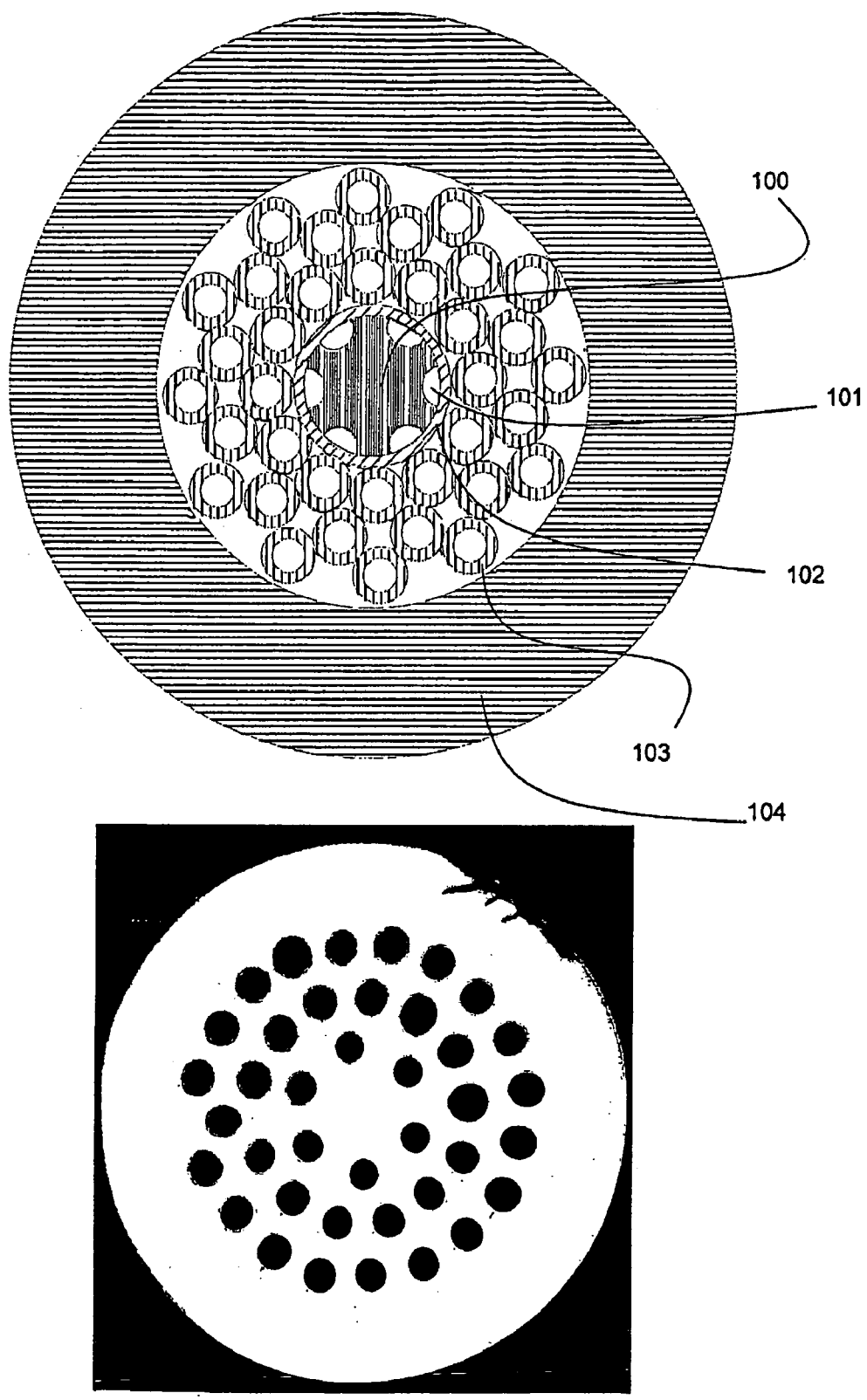
FIG. 10 shows a schematic example (top) of the cross section of a preform according to the present invention that utilises a central rod having grooves extending in the longitudinal direction of the rod. The figure further shows a photographs (bottom) of a microstructured fibre fabricated using a central rod comprising six grooves.

The present inventors have further realized methods that include fabrication of preforms where tubes and/or rods having grooves and/or slits are combined with the use of capillary tubes. As the guided mode in microstructured fibres is most strongly influenced by the structure in the core region and its nearest surroundings, it may be preferred only to have the innermost part of the preform formed using laser etched grooves and/or slits. FIG. 10 shows a schematic example (top) of the cross section of a preform with a combination of a solid rod (100) having grooves (101) along its length surrounded by a single, sleeving tube (102) that is further surrounded by a multitude of capillary tubes (103). The preform also includes an overcladding tube (104) surrounding the capillary tube (103), the sleeving tube (102), and the laser-etched rod (100).

FIG. 10 shows a photograph (bottom) of fibre pulled from perform comprising a central rod having six $CO_2$ laser written grooves, the rod with grooves being sleeved inside a first tube that again is surrounded by a number of capillary tubes stacked in an overcladding tube—as shown schematically in FIG. 10 (top). The outer diameter of the preform was 25 mm and the fibre diameter is 125 μm.

The sleeving of the rod with grooves into the first tube was performed in a lathe where the first tube was attached to the non-grooved outer surface of the rod under heat treatment. The heat treatment was done using a conventional lathe for processing of optical preforms. After sleeving, the preform element comprising the rod with grooves and the first tube was placed in an overcladding tube together with the capillary tubes to form the final preform. This preform was drawn in a conventional drawing tower. The drawing conditions and manners of controlling the voids may be found in literature, for example in the above-mentioned DiGiovanni et al. reference or references therein.

The six inner (laser-formed) holes became circular when pulling and they are uniform in diameter. The capillary-formed holes are less uniform and circular due to slack in stacking. This slack may be eliminated in various ways for example by using more dense stacking of the capillary tubes (e.g. by using a larger number) or by using an overcladding tube with a non-circular inner shape (e.g. a hexagonal shape). Hence, a good uniformity of the voids in the final fibre may be obtained by using grooves.

For certain applications, it may be preferred that the various components of the preform are made of different materials—such as different glasses or different polymers. Particularly, the solid rod may consist of silica-based materials with various refractive index profiles. These index profiles may be obtained from doping techniques - fabricating the solid rod using for example modified chemical vapour deposition.

The grooves and/or slits may also be fabricated using other means than laser etching or laser ablation, such as for example mechanical sawing or mechanical drilling. Preforms or parts thereof comprising rods or tubes having a multitude of longitudinal grooves and/or slits manufactured by such means are also included in the present invention.

It is an advantage of the method utilising sleeving of concentric tubes that channels resulting from grooves/slits in the same tube/rod are at all times fixed in position with respect to each other. This provides improved reproducibility for the fabrication of microstructured fibres compared to prior art methods based on stacking of capillary tubes.

The present inventors have further realised that the here-disclosed methods that provide a position fixation of channels is further advantageous by providing a potential reduction of degrading effects in the final microstructured fibres—such as for example polarisation mode dispersion—that appear in prior art microstructured fibres.due to non-symmetric. arrangements of features in the. cross section of the fibres. In the prior art method using stacking of tubes and/or rods, the tubes/rods may unintentionally slide away from desired positions during preform fabrication and/or fibre drawing resulting in non-symmetric microstructures in the cross section of the final fibres.

It is further advantage of the methods that utilises laser ablation and the method that utilises laser etching of grooves and/or slits that both methods may be fully automated yielding a high reproducibility.

It is a further advantage of the method disclosed in this patent application that utilises laser etching or laser ablation of channels (including grooves and slits) that the method, in principle, does not introduce contamination of the preform material as no mechanical means are used to form the channels, and the method may therefore be used to obtain ultra-clean preforms.

In the prior art, microstructured fibres that operate by photonic bandgap effects and that have been demonstrated experimentally have been fabricated using a high number of capillary tubes (see Knight et al, Science, Vol. 282, pp. 1476–1478, 1998; Cregan et al, Science, Vol. 285, pp. 15371539, 1999; West et al, proceedings of the European Conference on Optical Communications, pp. 41–42, 2000). Due to the aforementioned disadvantageous of using capillary tubes for the fabrication of microstructured fibres, it is desired to limit most possible the use of capillary tubes. The present inventors have realized a method aimed at fabrication of microstructured fibres, where at only a single capillary tube is employed for the realization of the core and inner cladding region. Outer capillary tubes may optionally be used for mechanical or other non-optical reasons.

The method comprises a number of steps and it will be described using FIG. 11 and 12 as examples.

As a first step of the method, a preform is provided. FIG. 11 (top) shows schematically a cross section of a preform according to the present invention. The preform comprises a single, capillary tube (110) placed in a centre of the preform. Surrounding the single capillary tube (110) is a number of solid rods (111). The rods (111) have preferably a circular shape and preferably have an outer diameter that is substantially identical to that of the single capillary tube (110). The use of rods and a single capillary tube of substantially identical outer diameter allow a close-packed stacking of the rods and the single tube—providing a very regular pattern of interstitial voids (112). For optimum operation of a microstructured fibre drawn from the preform, it is important that as large a region as possible in and around the preform centre is close-packed. It is, therefore, desired to have as many rings of close-packed rods surrounding the single capillary tube as possible, such as at least two rings, such as at least three, such as at least five rings. In practice, the number of rings of close-packed rods surrounding the single tube is limited as the preform in preferred embodiments comprises an overcladding tube (113) with a circular inner shape. In order for the close-packed rods and single capillary tube to be as well stabilized as possible inside the overcladding tube, it is may be preferred to introduce yet other rods or optionally tubes (114) of usually smaller outer diameter than the rods.

As a second step of the method, the preform is drawn into a cane using a slight under pressure inside the overcladding tube. The under pressure assures close-packing of the rods and single capillary tube of identical outer diameters. Naturally, the under pressure must be controlled and not be too strong in order for the interstitial holes to remain open. The single capillary tube may either be open during drawing into cane, it may be sealed in the opposite end from which the drawing takes place, or preferably the pressure may be controlled actively and independently of the pressure in the overcladding tube.

Figure 11:
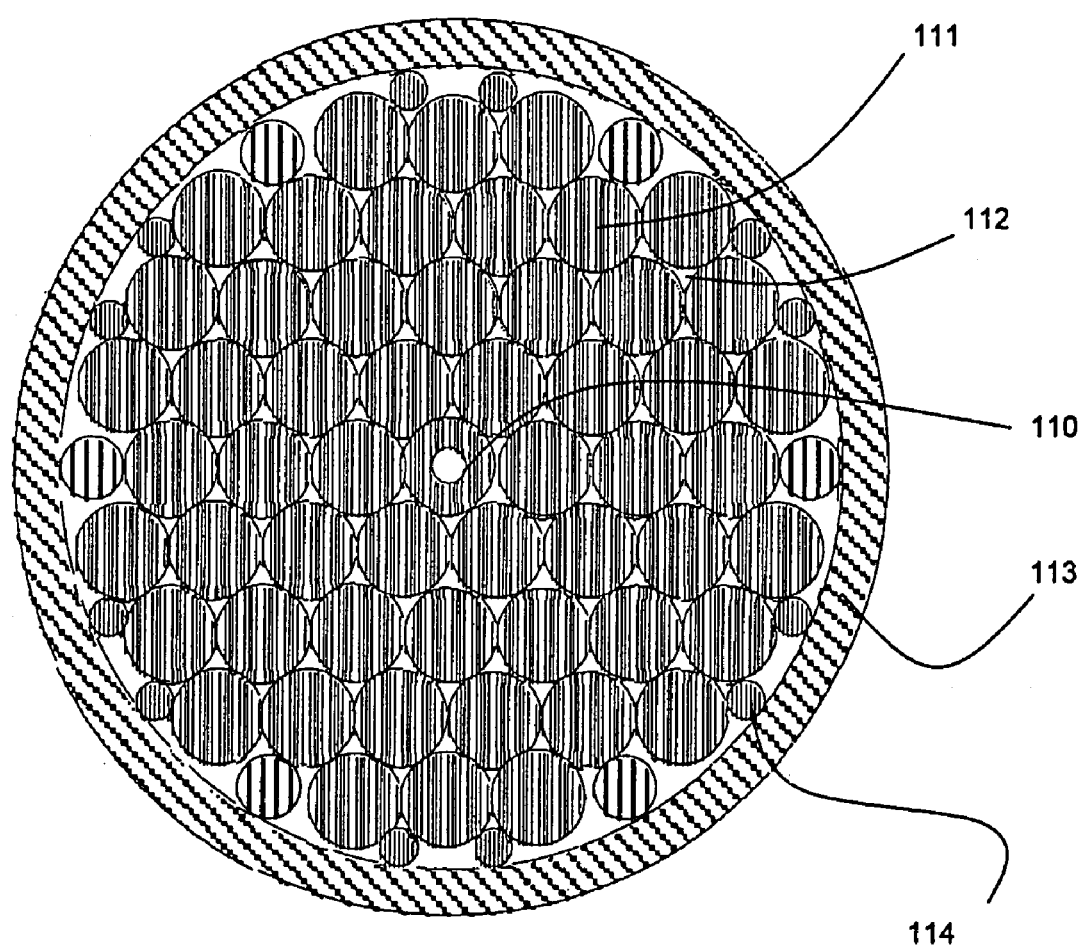
FIG. 11 shows schematically an example (top) of a preform according to the present invention for fabrication of microstructured fibre that may guide light using photonic bandgap effects. The preform uses only a single capillary tube in order to realise a low-index core region.
Figure 11:
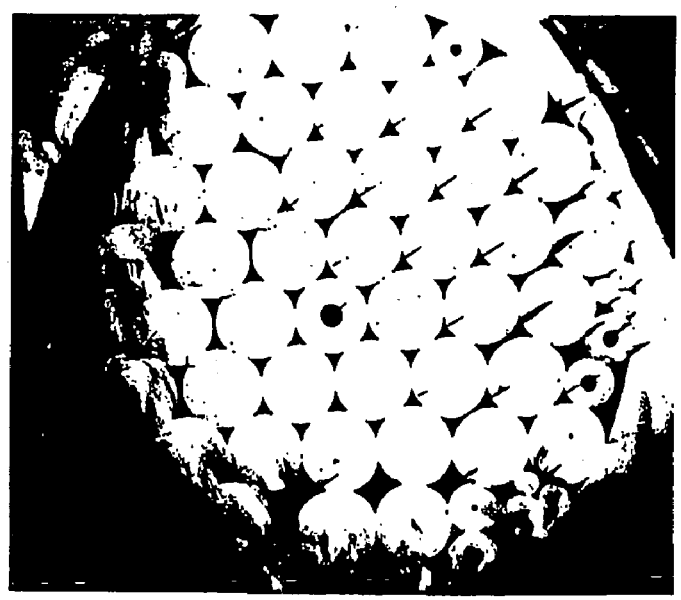
Figure 12:
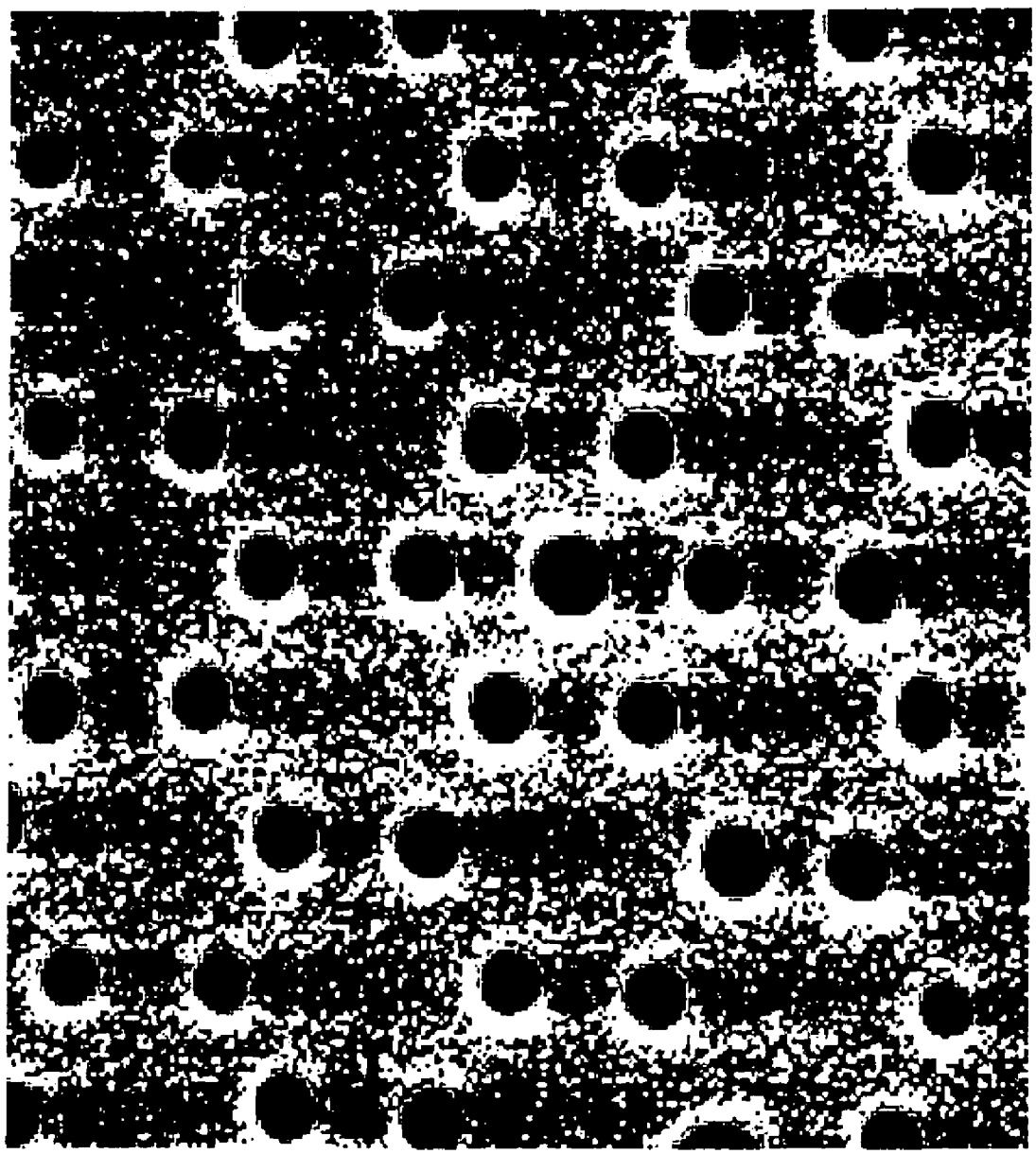
FIG. 12 shows a scanning electron micrograph of the inner structure of a microstructured fibre fabricated by a method according to the present invention.

An example of a cane having an outer diameter of around 3 mm is shown in FIG. 11 (bottom). The photographic picture shows that the interstitial voids may be well positioned in a periodic structure in a region surrounding the centre of the cane.

As a next step, the cane may be drawn into fibre using a conventional drawing tower. Additionally, the cane may be overcladded yet on or more times. Naturally, it may be advantageous to control also the pressure inside the cane during drawing into fibre in order to control the size and shape of the interstitial holes as well as of the central hole formed from the inside of single capillary tube in the original preform. The pressure inside the central hole may preferably be controlled independently. As an example of a microstructured fibre that may be realised using the present invention, FIG. 12 shows a scanning electron micrograph of the inner structure of such a microstructured fibre. The interstitial holes are seen to have obtained a substantially circular shape and they are arranged as isolated, microstructured features in a very regular honeycomb pattern—a microstructured feature having a centre-to-centre distance to a nearest neighbouring feature of approximately 2 μm. Both the arrangement and the centre-to-centre distance are as desired and comparable to prior art microstructured fibres guiding light by photonic bandgap effects (see the above-referenced article by Knight et al. in Science), but realised using a method where a high number of capillary tubes are stacked. It is, however, important that microstructured fibres fabricated using the here-presented method potentially have much lower propagation losses due to improved cleanliness as previously discussed. Furthermore, as the glass quality—in terms of low impurities—are often better for solid rods than for capillary tubes, microstructured fibres realised by using the method disclosed by the present inventors will have lower propagation losses than microstructured fibres fabricated using the prior art method using a high number of capillary tubes. One of the main reasons for this is the reduction of OH contamination, usually associated with the glass surface. Hence, a reduction of the total surface area in a preform using rods as replacements for tubes is preferable. Furthermore, the reduction of inner surfaces that are generally more difficult to clean than outer surfaces (due to hindered access), the above-described method provides potentially lower total fibre losses.

As holes of different size may behave differently during drawing, it will be advantageous to have the hole inside the single capillary tube to have a cross-sectional area substantially identical to that of a single interstitial void. From close-packed stacking of the rods, the interstitial voids will in total occupy an area of around 9% of the cross section. For the hole in the single capillary tube to occupy around 9% of the total area of the capillary tube, is desired to have a certain relation between the inner and outer diameter of the single capillary tube. Due to the fact that the rods will melt together during drawing into cane, the interstitial voids will occupy an area less than 9%—more likely around 8%. Hence, it may be preferred to have the inner diameter around 0.3 times the outer diameter. For certain applications, it may, however, be preferred to have a different relation between the inner and outer diameters in order for the resulting microstructured fibre to have specific waveguiding properties, such as e.g. specific dispersion properties. In most such cases, the inner diameter will be in the range of between 0.1 and 0.6 times the outer diameter.

With respect to reproducibility and longitudinal uniformity of the fabricated microstructured fibres, it is an advantage of the above-described method of realising microstructured fibres with honeycomb cladding structures and a low-index core that only an outer diameter must be controlled. The prior art method, which utilises stacking of capillary tubes and rods, requires also an accurate control of the outer diameter of the rods and tubes, but it additionally requires an accurate control of an inner diameter of the capillary tubes—this is avoided in the above-described method.

Figure 13:
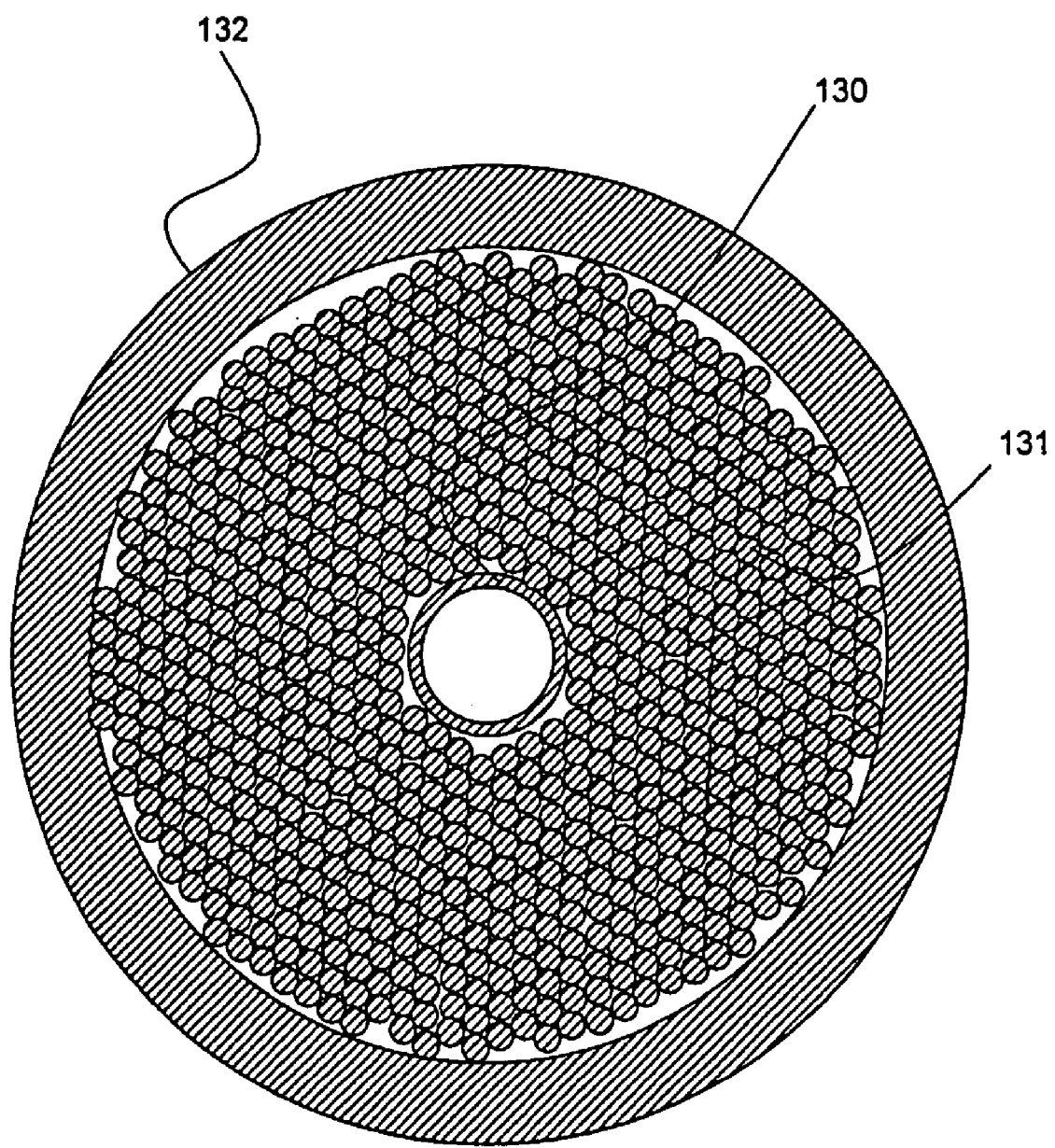
FIG. 13 shows schematically another example of a preform according to the present invention for fabrication of microstructured fibre that may guide light using photonic bandgap. The central tube is significantly larger than the rods surrounding the tube.

Other preforms according to the present invention are shown in FIG. 13. The figure shows examples of fibre comprising a single central capillary tube (130) of significantly larger dimensions than the surrounding solid canes (131). Again, a large overcladding tube (132) is used for holding the preform together.

It is an advantage of all methods presented in this patent application compared to methods based on extrusion that contamination of the fibre preform material may be significantly reduced. This is an important advantage in order to obtain microstructured fibres with low propagation losses.

The rods, tubes and the preforms or parts thereof according to the present invention may be handled in manners similar to the handling of prior art rods, tubes and preforms for drawing microstructured fibres (see for example the afore-mentioned DiGiovanni et al. reference or references therein). For drawing of microstructured fibres from glass-based preforms according to the present invention, similar drawing conditions as described by DiGiovanni et al. may be used (including temperature, pulling speeds etc.). For other materials of the background material, for example polymer, other drawing conditions may be used. For polymer-based preforms or parts thereof according to the present invention, drawing and handling conditions as for example described by Eijkelenborg et al. in Optics Express, Vol. 9, No. 7, page 319, 2001, or by Argyros et al. in Vol. 9, No. 13, pp. 813, 2001 may be employed also for the present invention.

The present inventors have further realised manners of fabricating microstructured fibres that may provide low splicing losses to other microstructured fibres as well as to conventional optical fibres.

Figure 14:
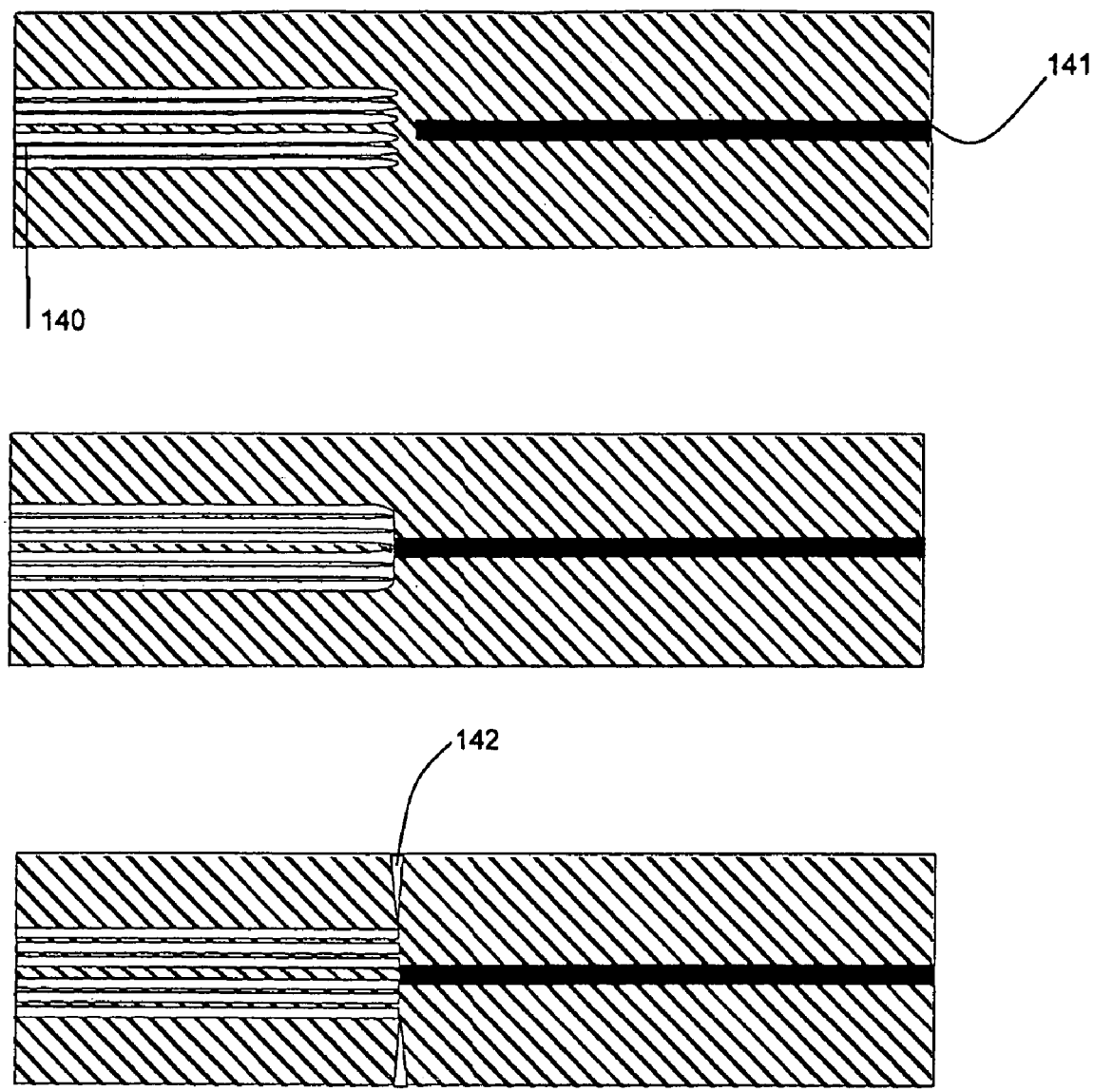
FIG. 14 shows schematic examples of potential problems related to splicing of prior art microstructured fibres to conventional optical fibres.

The present inventors have realised that microstructured fibres according to the prior art may be problematic to splice, due to expanding or collapsing of air holes during splicing with usual parameters, or splicing with low mechanical pull strength may result for example due to non-adhesive connection at the splice. The potential problems are illustrated schematically in FIG. 14 for a splice between a microstructured fibre with elongated air holes (140) and a conventional fibre with a doped core (141). With usual splicing parameters the splice may be too hot and the joining of the fibre ends may be performed too late—causing a collapse of the air holes in the end of the microstructured fibre—see FIG. 14 (top). If, on the other hand, the joining is performed too fast—with respect to the time of heating the end of the microstructured fibre—the holes may expand significantly due to the fact that air which expand during heating may not escape the region around the fibre joint (see FIG. 14 (middle)). Both cases of collapsing and expanding air holes will degrade the waveguiding properties of the microstructured fibre and introduce an undesirably increased coupling loss between the microstructured fibre and the conventional fibre. In order to avoid the collapse or expansion of the air holes, it could be imagined to lower the splicing temperature. A problem, using prior art fibres in this respect, may, however, be an insufficient joint as illustrated schematically in FIG. 14 (bottom), where undesired gaps (142) exist in the fibre joint. Such undesired gaps may degrade the mechanical stability of the fibre joint, and is naturally disadvantageous.

The present inventors have realised microstructured fibres comprising one or more specially designed regions of low viscosity glass—compared to the viscosity of the glass in the region comprising the microstructure—that are advantageous compared to prior art microstructured fibres with respect to splicing losses. The present inventors have realised methods of fabricating such microstructured fibres, including methods of fabricating preforms or parts thereof for such fibres, as well as the present inventors have realised a number of preferred designs of such fibres.

To identify the temperature at which glass articles deform under their own weight (for example, shaping through slumping), the so-called softening temperature ($T_{7,6}$) is designated. That is the temperature at which the glass has a viscosity of $10^{7,6}$ dPa.s. The softening temperature is also referred to as softening point.

Typically $T_{7,6}$ is around 1650–1700° C. for a pure silica glass. For other types of glasses, for. example various types of compound glasses, $T_{7,6}$ may be significantly lower. Especially for polymers $T_{7,6}$ may be much lower than for pure silica, such as typically in the range of a few hundred degrees Celsius or less. The softening temperature of various materials, including silica and doped silica glasses may for example be found in text- or data books.

By incorporating in the fibre a material having a lower viscosity than the background material of the microstructured part of the fibre, i.e. softening at lower temperature than the background material, good fusion of the two fibres can be obtained, while keeping the microstructure in the microstructured fibre substantially unchanged. The parameters of the splice are chosen so that the low viscosity material softens and adheres to the other fibre while the microstructure remains unchanged by the splicing process.

Figure 15:
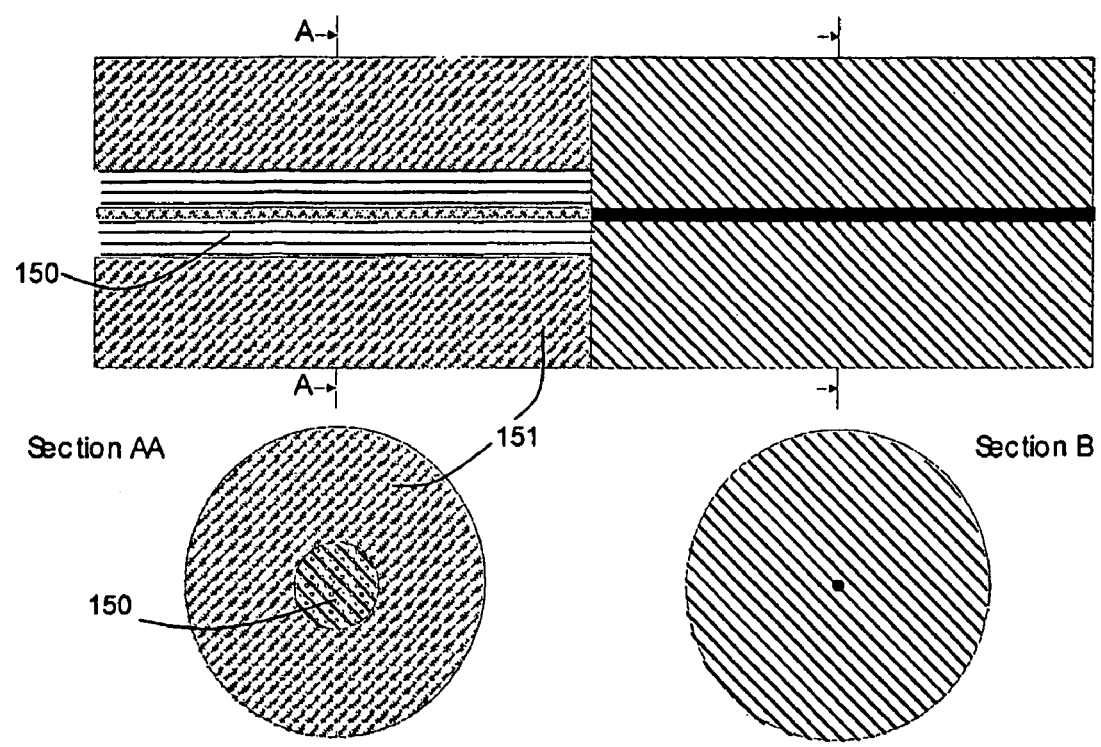
FIG. 15 shows schematic examples of fibre lengths according to the present invention, wherein the length comprises a microstructured fibre that incorporate low viscosity glasses at predetermined regions (equivalently the fibre comprises high viscosity glasses at (other) predetermined regions). The figure also includes schematic illustrations of cross sections of the optical fibres comprised in the fibre length.

An example of a microstructured fibre and a fibre splice according to the present invention is illustrated schematically in FIG. 15. The microstructure (150) in the microstructured fibre is surrounded by a ring of softer material (151) extending from the outer edge of the microstructure to the outer edge of the microstructured fibre. The soft material layer can for example be deposited by a chemical vapour deposition (CVD) technique, or by tube jacketing.

In one implementation the background material of the microstructure is pure silica and the low viscosity ring is made of silica doped with fluorine, or with phosphorus, or with germanium, or with chlorine, or with any combination of these.

Figure 16:
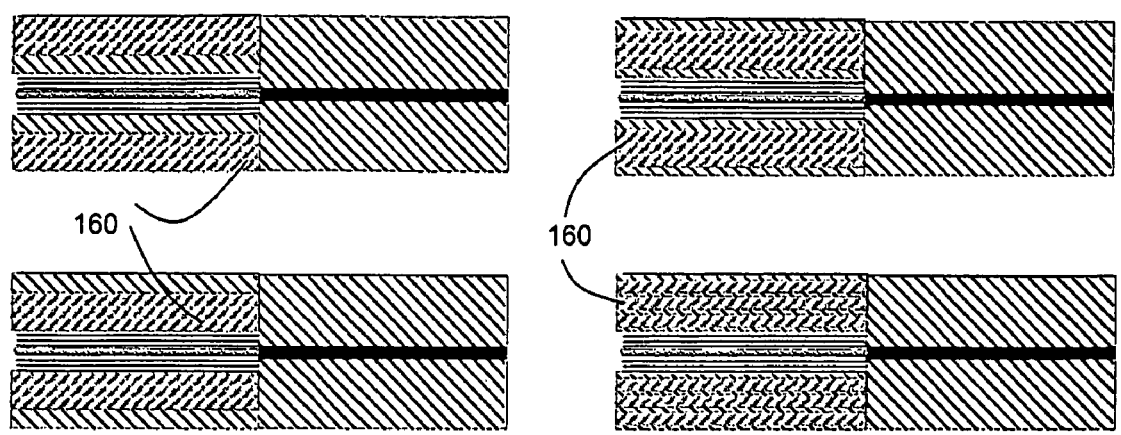
FIG. 16 shows yet other schematic examples of fibre lengths according to the present invention, wherein the lengths comprise a microstructured fibre that incorporates low viscosity glasses at predetermined regions.

Other examples of microstructured fibres according to the present invention and splices incorporating such fibres are illustrated schematically in FIG. 16.

In the basic implementation, the low viscosity material fills the whole fibre volume except the microstructure volume—as shown in FIG. 15. The volume shall be referred to as the overcladding volume. The present inventors have realised other designs of microstructured fibres comprising low viscosity glasses that may be further advantageous. FIG. 16 shows implementations where the low viscosity material (160) only partially fills the overcladding volume. Such implementation might be easier and less costly to realize than the basic implementation using standard fibre fabrication techniques.

Figure 17:
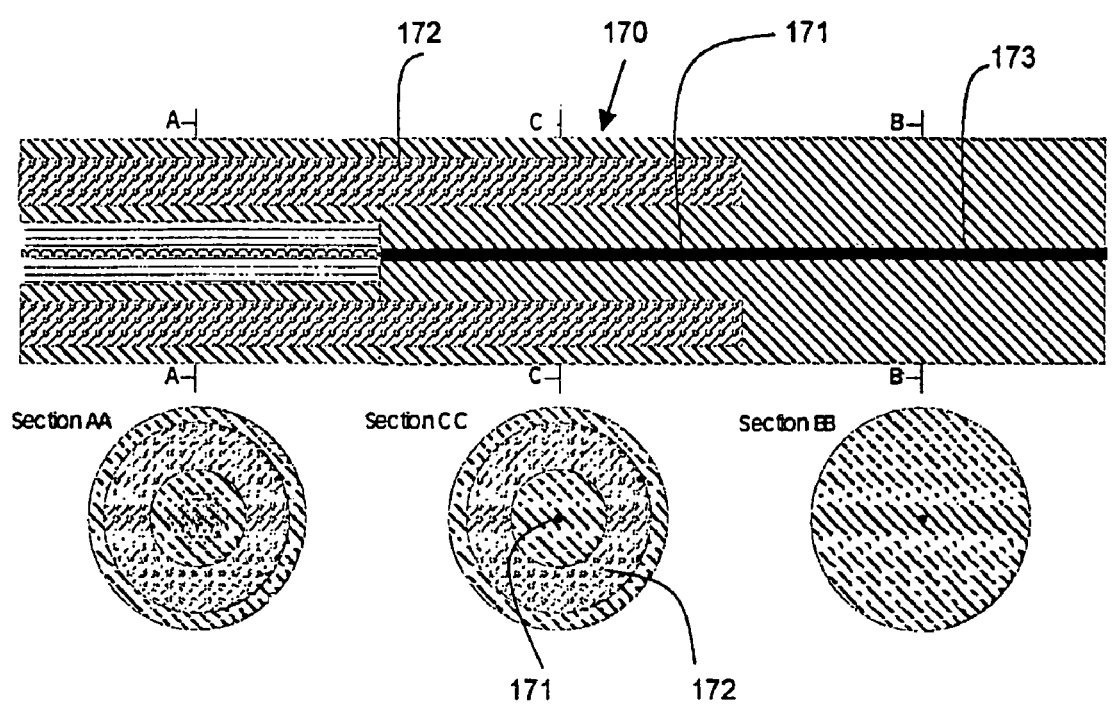
FIG. 17 shows yet another schematic example of a fibre length according to the present invention, wherein the fibre length comprises a microstructured fibre that incorporates low viscosity glasses at predetermined regions, and further comprises an intermediate fibre that incorporates low viscosity glasses at predetermined regions. The figure also includes schematic illustrations of cross sections of three optical fibres comprised in the fibre length.

The present inventors have further realised that the addition of an intermediate fibre placed between a microstructured fibre and a conventional fibre may be beneficial. An example of such a fibre long length including three shorter fibre pieces is schematically illustrated in FIG. 17. The intermediate fibre (170) may be a conventional fibre having a doped core (171) and including a low viscosity material region (172), like the microstructured fibre. An advantage of this addition is that the microstructured fibre and the intermediate fibre can be spliced robustly at a relatively low temperature without affecting the microstructure structure due to the contact of the low viscosity regions of both fibres. The other end of the intermediate fibre (173) can be spliced to the conventional fibre in the conventional manner since there are no air holes present at the splicing interface.

Figure 18:
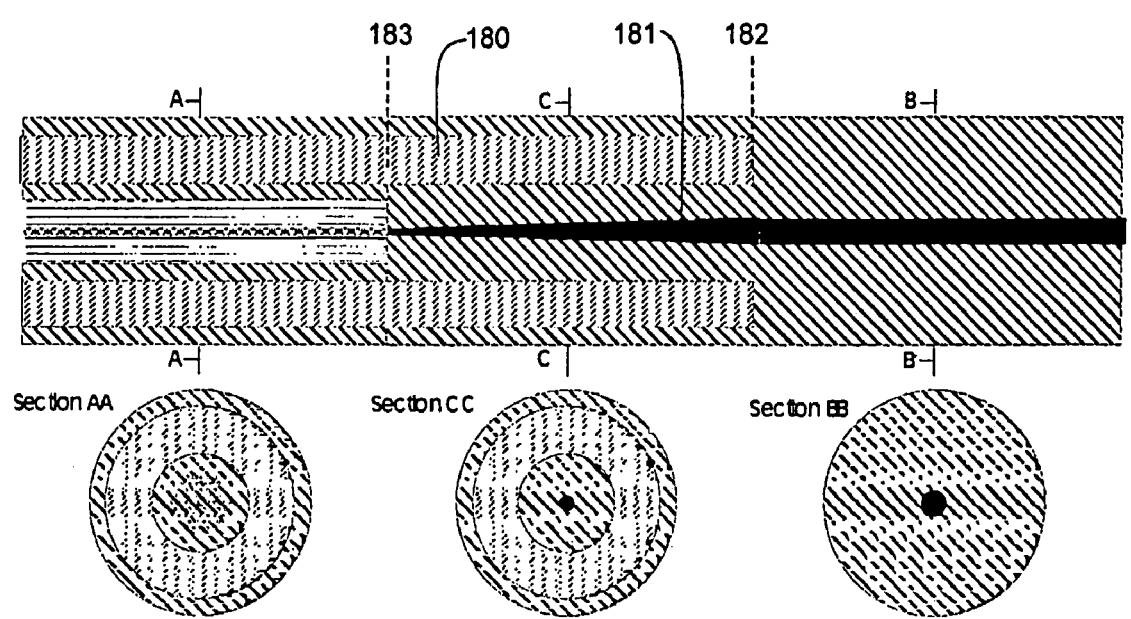
FIG. 18 shows yet another schematic example of a fibre length according to the present invention, wherein the length comprises a microstructured fibre that incorporates low viscosity glasses at predetermined regions, and further comprises an intermediate fibre that incorporate low viscosity glasses at predetermined regions as well as a tapered core. he figure also includes schematic illustrations of cross sections of three optical fibres comprised in the fibre length.

FIG. 18 illustrates yet another example of a fibre length according to the present invention. It is well known to those skilled in the art of microstructured fibres, that the propagation mode(s) supported by a microstructured fibre can be significantly different to the modes supported by conventional fibres. In order to provide a coupling with low losses of light travelling from a microstructured fibre to a conventional optical fibre (or the other way), the present inventors have further realised that it is advantageous to introduce an intermediate fibre between the two fibres. The intermediate fibre preferably comprises both a low viscosity glass (180) and a core region (181) being non-uniform in the longitudinal direction of the intermediate fibre—such as for example a tapering. The non-uniformity provides mode matching at the two fibre splices (182) and (183) and the low viscosity glass (180) provides low splicing losses at the joint between the microstructured fibre and the intermediate fibre.

Figure 19:
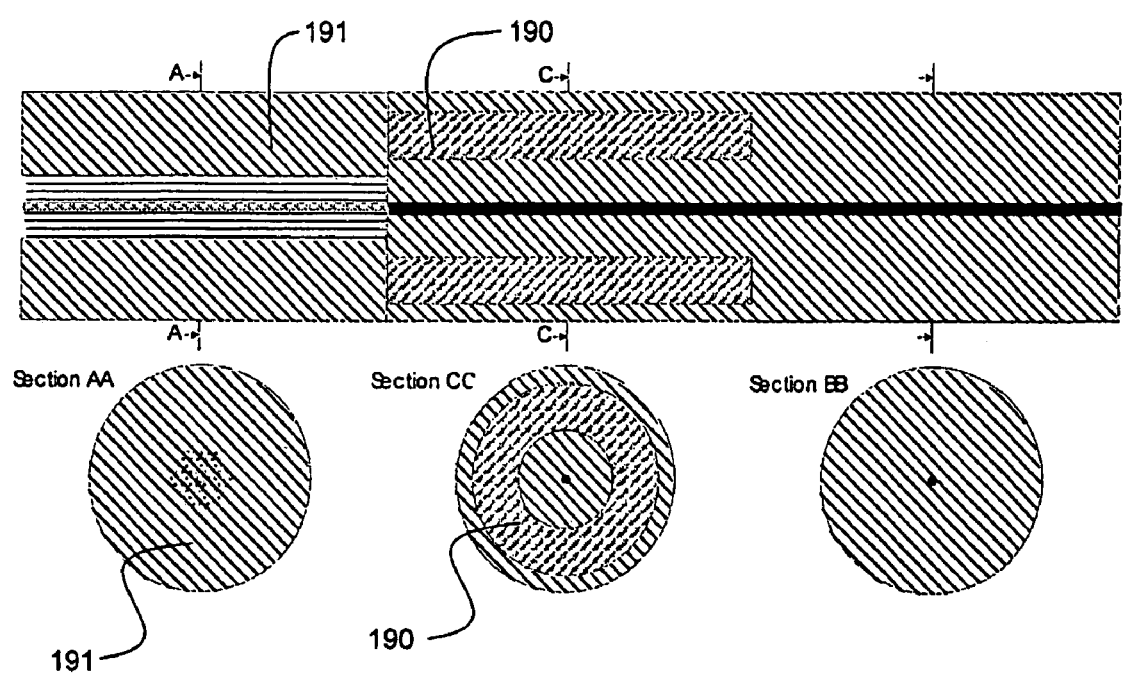
FIG. 19 shows yet another schematic example of a fibre length according to the present invention, wherein the length comprises a microstructured fibre of a single material, and further comprises an intermediate fibre that incorporate low viscosity glasses at predetermined regions. The figure also includes schematic illustrations of cross sections of three optical fibres comprised in the fibre length.

As another example of a length of fibre comprising a microstructured fibre, an intermediate fibre providing mode matching and spliceability, and a conventional optical fibre is illustrated in FIG. 19. In this example only the intermediate fibre comprises a material (190) with a low viscosity. The microstructured fibre comprises in this example only a single material (191) (apart from the material of the channels) having a higher viscosity than the material (190).

Although only intermediate fibres without microstructures have been presented in the examples, also intermediate fibres comprising microstructures are a part of the present invention.

Figure 20:
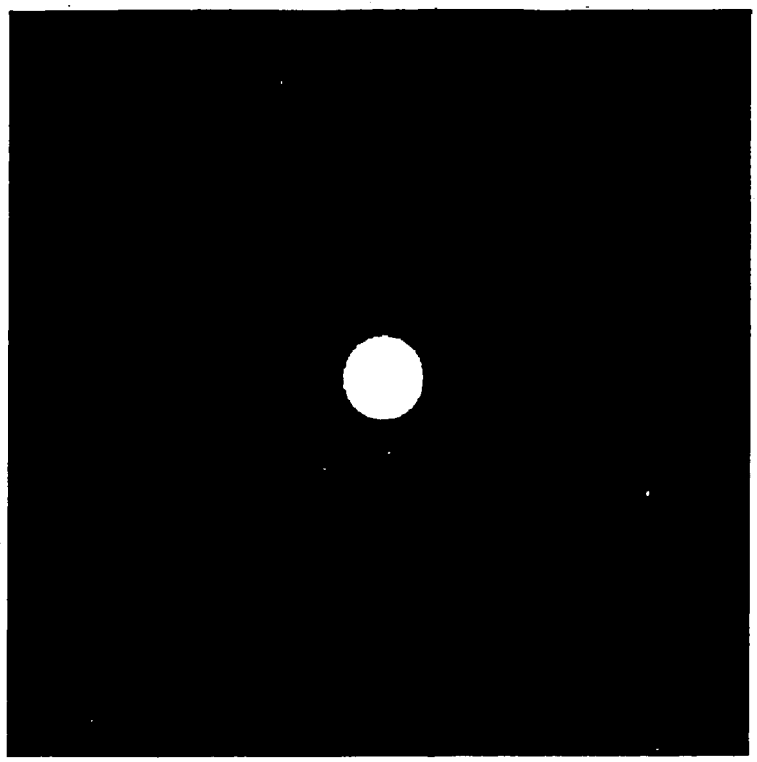
FIG. 20 shows a photograph (top) of an optical fibre for use in a long fibre length comprising a microstructured fiber. The bottom part of the figure shows a schematic of the cross-section of the fibre.
Figure 20:
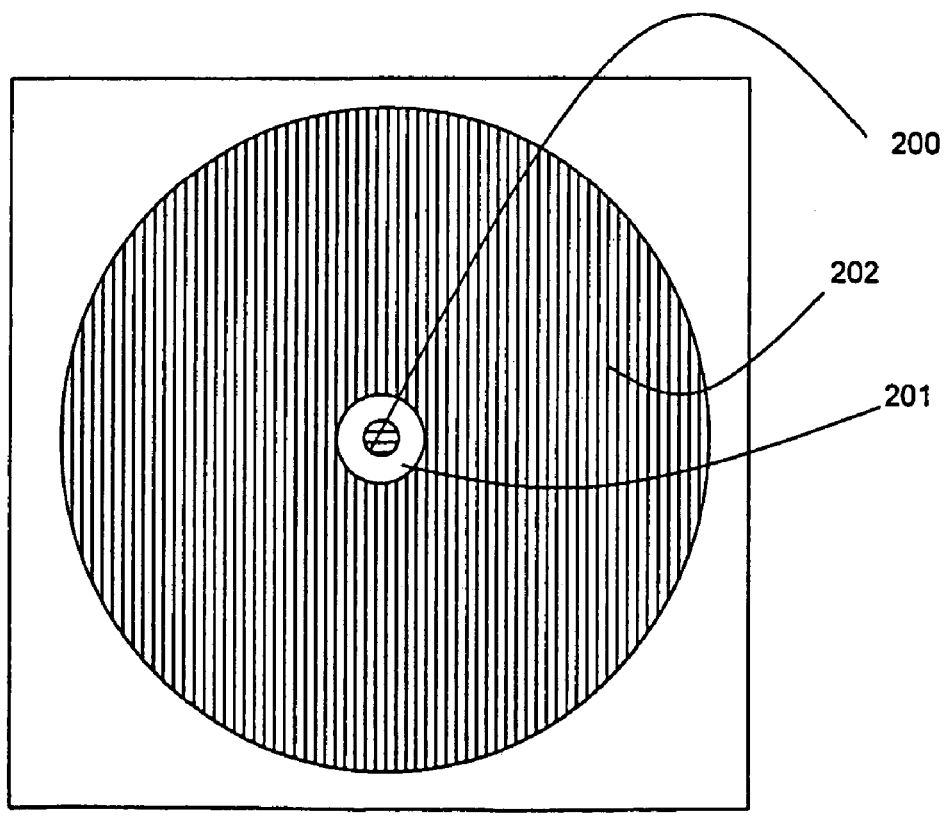

As a demonstrator, the inventors have fabricated a solid fibre with an outer cladding consisting of highly fluorine-doped glass (2 wt %). This fibre consisted of 3 glass types: an outer F-doped cladding, an inner pure silica cladding and a Ge-doped core. The fibre resembles the intermediate fibre in FIG. 190, except that the low viscosity glass is placed in direct contact with the core. At the softening point ($10^{7.6}$ dPa·sec), the viscosity of F-doped glass is around $10^6$ dPa·sec. The outer diameter of the outer cladding was 125 um, the outer diameter of the inner cladding was 15 um and the core had a diameter of 3 um. The Ge doping concentration in the core was chosen so that the core supported only the fundamental optical transverse mode (LP00). A picture of the cleave facet of the realised fibre (top) and a drawing of the design (bottom) can be seen in FIG. 20. The figure shows schematically the core (200), the inner cladding (201), and the outer cladding (202).

To show that this glass material gets softer at lower splice temperatures than pure silica, this fibre was spliced to itself using a splice recipe optimised for standard single mode fibre (SMF28, Corning). The splice heating parameter is P=20.5 W. The result can be seen in FIG. 21 (top). Firstly, the double-structure of the inner cladding and the core are clearly seen from this side view picture (light region). Secondly, it is clear that these inner structures are "sagging". This is evidence of the outer cladding being soft during heating, thus allowing the inner structures to move during splicing.

Figure 21:
FIG. 21 shows photographs of two fibre splices performed at a high power (top) and at a low power (bottom).
Figure 21:
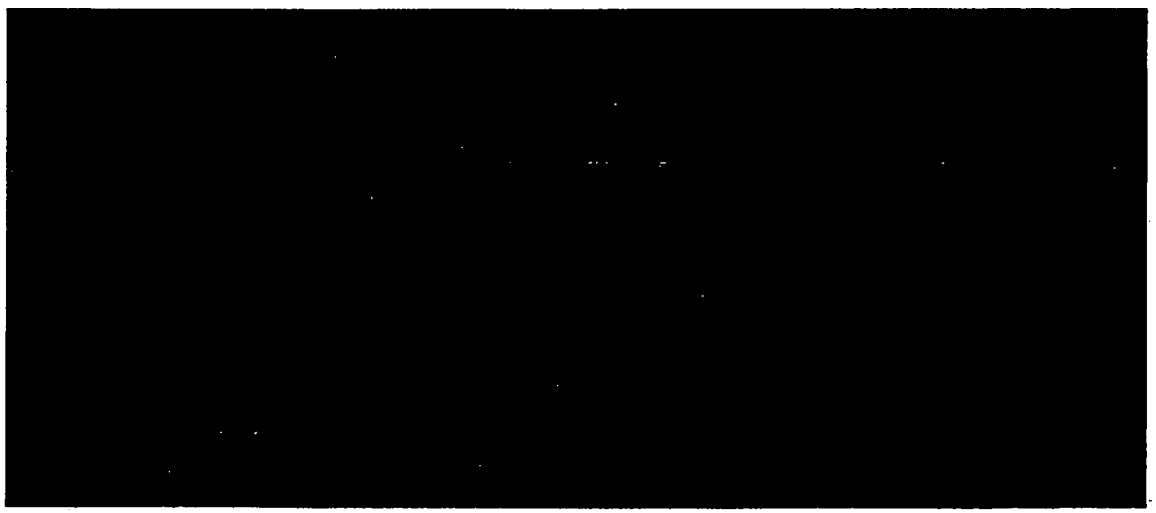

Reducing the heating during splicing makes it possible for the outer cladding to "hold" the inner structures in place during splicing, thus keeping them straight. The splice heating parameter in this case is P=18 W. The result is seen in FIG. 21 (bottom).

Finally, it should be mentioned that the improvements disclosed in the present patent application relate to—but are not limited to—all presently known applications of microstructured optical fibres and of other optical fibres.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A preform for a microstructured fibre or a part for a preform for a microstructured fibre, said preform or part having a length in a longitudinal direction and a cross section perpendicular thereto, said preform or part comprising a rod arranged at the center of the preform or part, and one or more tubes concentric to said rod, said rod being sleeved inside a first of said one or more concentric tubes, said rod and/or at least one of said concentric tubes having grooves and/or slits extending in said longitudinal direction, with a number of innermost longitudinally extending grooves and/or slits with respect to the center of the preform or part being at least six, such that said preform or part is adapted for a microstructured fibre.

2. The preform or part or part according to claim 1 wherein the number of innermost longitudinally extending grooves and/or slits with respect to a center of the preform or part is at least eight.

3. The preform or part or part according to claim 1, wherein at least two tubes are concentric to the rod.

4. The preform or part according to claim 1, wherein the number of innermost longitudinally extending grooves and/or slits with respect to a center of the preform or part is at least twelve.

5. The preform or part according to claim 1, wherein for the rod and/or at least one concentric tube, the number of grooves and/or slits is at least twelve.

6. The preform or part according to claim 1, wherein at least two concentric tubes have grooves and/or slits, each of said two tubes having at least six grooves and/or slits.

7. The preform or part according to claim 1, wherein at least two concentric tubes have grooves and/or slits, each of the two tubes having at least twelve grooves and/or slits.

8. The preform or part according to claim 1, wherein the grooves and/or slits are arranged so as to substantially form channels in said preform or part.

9. The preform or part according to claim 1, wherein for a tube or rod having grooves, each or at least part of said grooves are arranged on an outer surface of the tube or rod.

10. The preform or part according to claim 1, wherein for a tube having grooves, each or at least part of said grooves are arranged along an inner surface of said tube.

11. The preform or part according to claim 1, wherein at least a plurality of said grooves and/or slits are arranged substantially parallel to each other and extending in the longitudinal direction of the tube or rod.

12. The preform or part according to claim 10, wherein said grooves are arranged as helical grooves along the inner surface of said tube.

13. The preform or part according to claim 9, wherein said grooves are arranged as helical grooves along the outer surface of the tube or rod.

14. The preform or part according to claim 9, wherein said grooves and/or slits are arranged at predetermined positions along the outer surface of the tube or rod.

15. The preform or part according to claim 1, wherein one concentric tube having grooves and/or slits is sleeved inside another concentric tube in a substantially close-packed manner in order for the grooves and/or slits to form channels being substantially sealed off in the longitudinal direction and thereby being substantially isolated from each other.

16. The preform or part according to claim 15, wherein at least three concentric tubes are sleeved inside each other in a substantially close-packed manner in order for the grooves and/or slits to form channels being substantially sealed off in the longitudinal direction and thereby being substantially isolated from each other.

17. The preform or part according to claim 1, wherein a concentric tube having grooves and/or slits is sleeved inside a concentric tube having no slits or having no slits and no grooves.

18. The preform or part according to claim 1, wherein a concentric tube having grooves is sleeved inside another concentric tube having grooves.

19. The preform or part according to claim 1, wherein the rod includes parallel grooves in the longitudinal direction, said parallel grooves being formed on the outer surface of the rod.

20. The preform or part according to claim 19, wherein the parallel grooves in the rod are placed substantially equidistant from one another in a substantially circular symmetric pattern.

21. The preform or part according to claim 1, wherein the rod has no grooves extending in the longitudinal direction.

22. The preform or part according to claim 1, wherein the rod is sleeved inside the first concentric tube, said first concentric tube having no grooves and/or slits.

23. The preform or part according to claim 1, wherein the rod is sleeved inside the first concentric tube, said first concentric tube having grooves and/or slits.

24. The preform or part according to claim 1, wherein the preform or part includes at least two concentric tubes having grooves and or slits extending in said longitudinal direction.

25. The preform or part according to claim 1, wherein the preform or part includes at least three concentric tubes having grooves and or slits extending in said longitudinal direction.

26. The preform or part according to claim 1, wherein the preform or part includes at least four concentric tubes having grooves and or slits extending in said longitudinal direction.

27. The preform or part according to claim 1, wherein the preform or part includess an outer concentric tube having no grooves or slits.

28. The preform or part according to claim 1, wherein a plurality of the grooves extend the entire length of the preform or part.

29. The preform or part according to claim 1, wherein a plurality of the grooves and/or slits extend only a limited part of the length of the preform or part.

30. The preform or part according to claim 1, wherein for each tube having grooves and/or slits, the grooves and/or slits in the cross section are placed substantially equidistant from one another in a substantially circularly symmetric manner with respect to a center of said each tube.

31. The preform or part according to claim 1, wherein the preform or part includes at least two concentric tubes having the same refractive index.

32. The preform or part according to claim 1, wherein the rod and the first concentric tube have the same refractive index.

33. The preform or part according to claim 1, wherein the inner part of the innermost longitudinally extending grooves and/or slits with respect to the center of the preform or part are arranged at a distance greater than or equal to 0.5 times a total radius of the preform taken from the center to an outer surface of the preform.

34. The preform or part according to claim 1, wherein the rod has a predetermined refractive index profile with a high index center region, and wherein the inner part of the innermost longitudinally extending grooves and/or slits with respect to the center of the preform or part are arranged at a distance greater than or equal to 3 times a radius of said high index center region.

35. The preform or part according to claim 34, wherein the index profile of the rod includes a low index outer region surrounding said high index center region.

36. The preform or part according to claim 34, wherein the index profile of the rod is provided by use of doping techniques.

37. The preform or part according to claim 33, wherein the innermost longitudinally extending grooves and/or slits are arranged in the rod.

38. The preform or part according to claim 33, wherein the innermost longitudinally extending grooves and/or slits are arranged in a tube.

39. The preform or part according to claim 1, wherein at least part of the grooves and/or slits have dimensions in the cross section in a range from 0.5 mm to 50 mm.

40. The preform or part according to claim 1, wherein the preform or part includes a first region of a first type of tube of a first material and a second region of a second type of tube of a second material, said first material and said second material having different softening temperatures with softening temperature being defined as a temperature at which the material has a viscosity of $10^{7.6}$ dPa.s.

41. The preform or part according to claim 1, further comprising a multitude of capillary tubes.

42. The preform or part according to claim 41, wherein said multitude of capillary tubes are surrounded by an overcladding tube.

43. The A preform part according to claim 1, wherein the rod and/or the concentrically arranged tubes include a silica-based glass material.

44. A method of fabricating a preform or a part of a preform for a microstructured fibre, said preform or part having a length in a longitudinal direction and a cross section perpendicular thereto, said preform or part comprising a rod being arranged at the center of the preform or part, and one or more tubes concentric to said rod, said rod being sleeved inside a first of said one or more concentric tubes, said rod and/or at least one of said concentric tubes having grooves and/or slits extending in said longitudinal direction with a number of innermost longitudinally extending grooves and/or slits with respect to the center of the preform or part being at least six such that said preform or part is adapted for a microstructured fibre, said preform or part including elongated channels arranged at pre-determined positions and extending in the longitudinal direction of the preform or part, said channels including the grooves and/or slits of said rod or said one or more tubes of said preform or part of a preform being manufactured using a laser ablation technique or a laser etching technique.

45. The method according to claim 44, wherein the channels are formed using a laser beam being incident on the preform or parts thereof from a direction substantially perpendicular to the longitudinal direction.

46. The method according to claim 44, wherein the channels are formed using a laser beam being incident on the preform or parts thereof from a direction substantially parallel to the longitudinal direction.

47. The method according to claim 44, wherein the laser is a pulsed laser.

48. The method according to claim 44, wherein the laser is a CW laser.

49. The method according to claim 44, wherein the preform or part is heated to a temperature around or above 800° C. during at least part of said laser ablation or laser etching.

50. The method according to claim 44, wherein the preform or part is heated during or after sleeving of the tubes to close off side walls of the channels in the longitudinal direction thereof.

51. The method according to claim 44, wherein a slight under pressure is applied inside the tubes to ensure tight sleeving and closure of the side walls of the channels in the longitudinal direction.

52. The method according to claim 44, wherein the pressure inside each tube individually is controlled to control of the size and/or shape of the microstructure in the final fibre.

53. The method according to claim 44, wherein the pressure inside all the tubes together is controlled to control of the size and/or shape of the microstructure in the final fibre.

54. A method of fabricating microstructured fibres comprising the steps of:

providing a preform configured for a microstructured fibre, said preform having a length in a longitudinal direction and a cross section perpendicular thereto, said preform including a rod arranged at the center of the preform, and one or more tubes concentric to said rod, said rod being sleeved inside a first of said one or more concentric tubes, said rod and/or at least one of said concentric tubes having grooves and/or slits extending in said longitudinal direction with a number of innermost longitudinally extending grooves and/or slits with respect to the center of the preform being at least six; and drawing said preform into a microstructured fibre using one or more steps including drawing of said preform into a cane at an intermediate drawing stage.

55. The method according to claim 54, further comprising controlling a pressure inside each tube during the step involving drawing of the preform into a fibre and/or a cane.

* * * * *